United States Patent
Gillis et al.

(10) Patent No.: US 7,263,951 B2
(45) Date of Patent: *Sep. 4, 2007

(54) SELF CLEANING LITTER BOX MECHANISM

(75) Inventors: Greg Gillis, Escondido, CA (US); Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/867,194

(22) Filed: Jun. 14, 2004

(65) Prior Publication Data

US 2005/0284390 A1    Dec. 29, 2005

(51) Int. Cl.
*A01K 29/00* (2006.01)

(52) U.S. Cl. ...................................... 119/166; 119/165

(58) Field of Classification Search ........ 119/161–168; 209/235, 364, 369
See application file for complete search history.

(56) References Cited

U.S. PATENT DOCUMENTS

| 4,574,735 | A | * | 3/1986 | Hohenstein | 119/163 |
|---|---|---|---|---|---|
| 5,048,465 | A | * | 9/1991 | Carlisi | 119/166 |
| 5,226,388 | A |   | 7/1993 | McDaniel | |
| 5,477,812 | A | * | 12/1995 | Waters | 119/163 |
| 5,544,620 | A | * | 8/1996 | Sarkissian | 119/166 |
| 5,662,066 | A | * | 9/1997 | Reitz | 119/163 |
| 5,931,119 | A | * | 8/1999 | Nissim et al. | 119/163 |
| 6,082,302 | A |   | 7/2000 | Thaler et al. | |
| RE36,847 | E |   | 9/2000 | Waters | |
| 6,202,595 | B1 | * | 3/2001 | Atcravi | 119/165 |
| 6,205,954 | B1 | * | 3/2001 | Bogaerts | 119/166 |
| 6,286,459 | B1 | * | 9/2001 | Parr | 119/166 |
| 6,378,461 | B1 | * | 4/2002 | Thaler et al. | 119/166 |
| 6,401,661 | B1 | * | 6/2002 | Emery | 119/166 |
| 6,463,881 | B1 | * | 10/2002 | Reitz | 119/163 |
| 6,568,348 | B1 | * | 5/2003 | Bedard | 119/166 |
| 6,763,782 | B1 | * | 7/2004 | Kordelin | 119/166 |
| 6,837,180 | B2 | * | 1/2005 | Billi et al. | 119/166 |
| 6,851,386 | B2 | * | 2/2005 | Northrop et al. | 119/166 |
| 6,928,956 | B2 | * | 8/2005 | Parr | 119/166 |
| 7,017,519 | B1 | * | 3/2006 | Deasy et al. | 119/166 |
| 2004/0177816 | A1 | * | 9/2004 | Parr | 119/165 |
| 2005/0120969 | A1 | * | 6/2005 | Billi et al. | 119/166 |
| 2005/0172909 | A1 | * | 8/2005 | Emery | 119/166 |
| 2005/0284389 | A1 | * | 12/2005 | Gillis et al. | 119/166 |
| 2005/0284390 | A1 | * | 12/2005 | Gillis et al. | 119/166 |

* cited by examiner

*Primary Examiner*—Teri Pham Luu
*Assistant Examiner*—Joshua Michener
(74) *Attorney, Agent, or Firm*—Pitts & Brittian, PC

(57) ABSTRACT

An apparatus for a self-cleaning litter box having a control system for a mechanical self-cleaning mechanism. The litter box has a turret carrying a rake. Limit switches indicate the location of the rake and the turret. The box includes an animal sensor that detects the presence of an animal in the box. A specified time after the animal leaves the box, the turret sweeps the rake through the litter, picks up the collected waste, and carries it to a waste bin, where the waste is dumped. The litter box is controlled by a processor executing a software program that monitors the instruments and sensors and controls the turret and rake motors.

46 Claims, 37 Drawing Sheets

| Flag | Description |
| --- | --- |
| fTurret_lt | Turret is at rest position (beginning of track) |
| fTurret_rt | Turret is at the scoop position (end of track) |
| fTurret_md | Turret is half way through the track |
| fRake_dn | Rake is all the way down |
| fRake_md | Rake is midway |
| fRake_up | Rake is all the way up |
| fRake-moving-up | Rake is moving in the upward direction |
| fRake-moving-down | Rake is moving in the downward direction |
| fStop_rake | Stop the Rake |
| fMotor_oc | Motor overcurrent occurred |
| fTurret_moving_fwd | Turret is moving forward (away from the rest position) |
| fTurret_moving_rev | Turret is moving backward (toward the rest position) |
| fStop_turret | Stop the Turret |
| fPower_up | Unit just powered up |
| fKitty_detected | IR was interrupted (kitty is in the litter) |
| fBegin_countdown | Begin count down to scoop after kitty left the litter |
| fTimer | Time to service timers |
| fTest_mode | Unit is in Test Mode |
| fFaulty_litter | Litter is faulty (blockage was detected more than 3 times |
| fService_piezo | Time to service the piezo |
| fReversing | Motor was reversing before |
| fValid_low_count | Set when a valid low IR pulse was detected |
| fValid_high_count | Set when a valid high IR pulse was detected |

Fig.25

| Timers & Counters | Description |
|---|---|
| debounce_timer | Timer used to debounce all the switches |
| Overcurrent_timer | Timer to ignore overload during initial movement of Turret or Rake |
| IR_detect_timer | Timer to delay sensing of IR |
| Sec_cnt | 1 second counter |
| Min_cnt | 1 minute counter |
| Timer_15min | 15 minute timer |
| Delay_timer | Timer to allow delay between motion sequences |
| Fault_count | Counts number of times the rake was blocked |
| Reverse_timer | Timer to time motor reversing following detection of blockage |
| Timer_8sec | 8second timer used to generate a beep every 8 seconds if litter is faulty |
| IR_low_count | Used to time the IR low pulse in order to detect a 10Hz IR transmitter. The IR transmitter is used in production to speed up motion sequences during testing. |
| IR_high_count | Used to time the IR high pulse in the detection of the 10Hz IR signal (see IR_low_count) |
| Num_of_valid_IR_freq | Counts number of complete cycles of the 10Hz IR signal |

Fig.26

SELF CLEANING LITTER BOX MECHANISM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a self-cleaning litter box. More particularly, this invention pertains to a pet litter box with an electro-mechanical self-cleaning mechanism.

2. Description of the Related Art

Domestic cats kept as pets are usually trained to use a litter box for elimination of both liquid and solid wastes. A cat litter box is normally made of a liquid impermeable material so that a cat's urine will not leak through the box. The box may optionally have a cover. The litter used in these boxes may be one of any number of particulate litter or other materials that absorb moisture from the waste of the cat. The litter material may also suppress odor from cat waste. Some forms of litter form clumps when wet. Usually, a cat will bury its solid waste in the litter material in the box. The litter box requires periodic cleaning to remove the cat's solid waste and the litter that is saturated with urine.

Thus, a number of devices have been proposed for automating cleaning of cat litter boxes. The following patents illustrate the use of motorized cleaning mechanisms. U.S. Pat. No. 5,048,465, titled "Self-cleaning kitty litter box," issued to Carlisi on Sep. 17, 1991, discloses a kitty litter box with a motor, timing device, and a rake. U.S. Pat. No. 5,226,388, titled "Automated cat litter disposal system," issued to McDaniel on Jul. 13, 1993, discloses an automated cat litter disposal system for a cat litter box. U.S. Pat. No. 6,082,302, titled "Self-cleaning litter box," issued to Thaler, et al., on Jul. 4, 2000, discloses a self-cleaning litter box for cats with a comb drive. The litter box is rectangular and the comb moves through the litter until it encounters an obstruction, at which time it stops. The comb has a sensor for sensing contact with any obstruction encountered by the comb as it moves through the box.

U.S. Pat. No. RE36,847, titled "Automated self-cleaning litter box for cats," issued to Waters on Sep. 5, 2000, discloses an automated self-cleaning litter box for cats. The Waters patent describes a system for moving a comb through the litter contained in a rectangular litter box. The system is responsive to entry and exit of the cat from the litter box. In addition, Waters provides an improved disposal receptacle and alarms to report an insufficient litter supply and a fill disposal receptacle.

BRIEF SUMMARY OF THE INVENTION

According to one embodiment of the present invention, a control system for a pet litter box with a mechanical self-cleaning mechanism is provided. The litter box has a rake attached to a turret. The turret rotates the rake such that the rake sweeps through the litter. The litter box includes a rake motor and a turret motor, both controlled by a controller having a processor, memory, and an input/output module. Limit switches are used for controlling the positioning of the rake and turret. In one embodiment, motor overloads are used to ensure that the motors are functioning. A sensor is used to detect the presence of an animal. One embodiment has a litter alarm for announcing faulty or low litter to an operator. The controller executes a software program for operating the rake and turret.

In one embodiment, the rake has a cam that engages a waste bin lever, which opens the cover for the waste bin. In another embodiment, the rake includes protrusions that operate the rake limit switches. In another embodiment, the turret gear carries the turret limit switches, which are actuated by protrusions from the litter box base.

BRIEF DESCRIPTION OF THE SEVERAL VIEWS OF THE DRAWINGS

The above-mentioned features of the invention will become more clearly understood from the following detailed description of the invention read together with the drawings in which:

FIG. 25 is a table of flags used in one embodiment of the software;

FIG. 26 is a table of timers and counters used in one embodiment of the software;

DETAILED DESCRIPTION OF THE INVENTION

An apparatus for a self-cleaning litter box having an electro-mechanical self-cleaning mechanism is disclosed. The self-cleaning litter box is generally shown as item 10 on the drawings.

Figure 1:
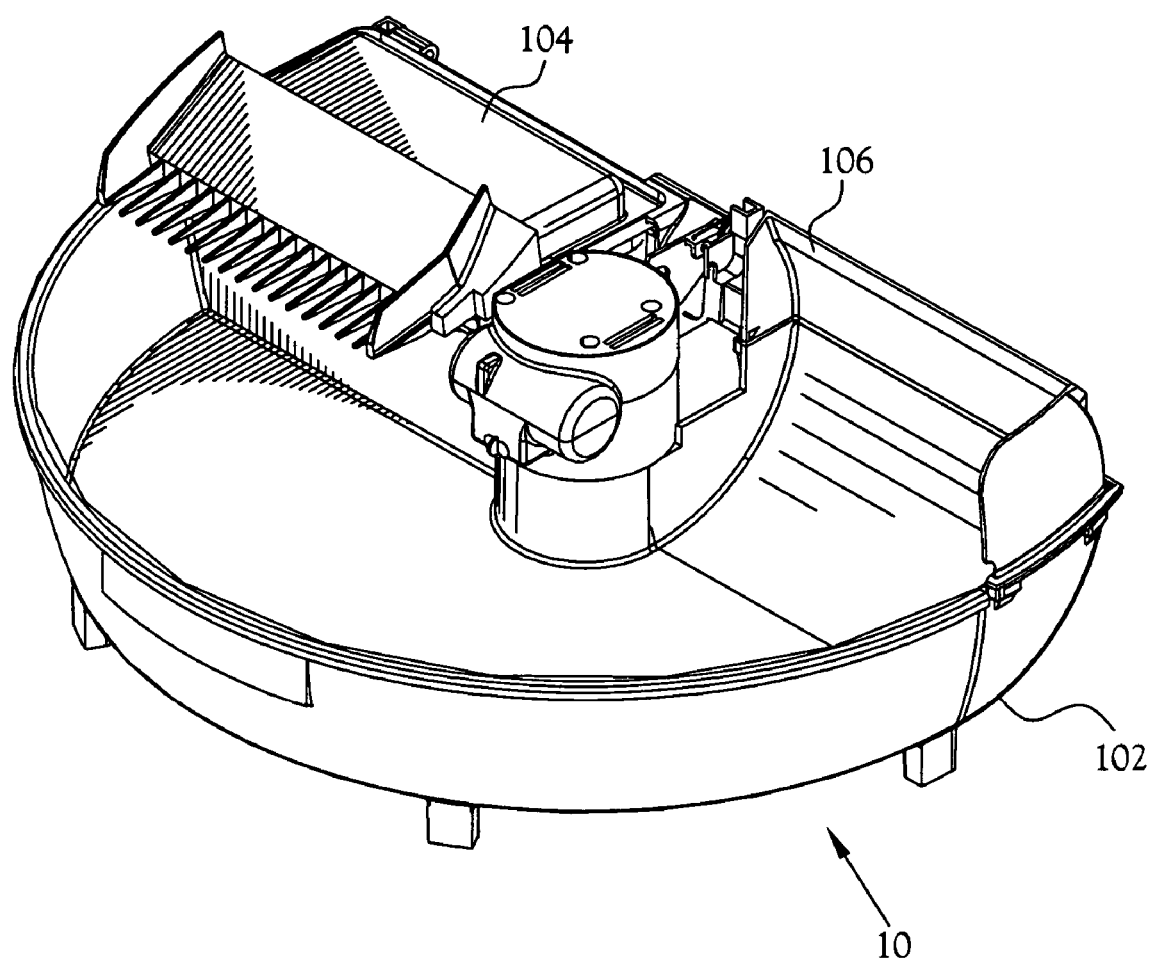
FIG. 1 is a perspective view of one embodiment of a self-cleaning litter box.

FIG. 1 illustrates a perspective view of one embodiment of a self-cleaning litter box 10. In the illustrated embodiment, a base 102 has a basin for holding litter. The base 102 is substantially semi-circular in plan view with sidewalls that gently slope inward towards the bottom of the base 102. A cover, or lid, 102 encloses a waste bin 214. In one embodiment, the lid 102 is formed of one piece that entirely covers the waste bin 214, which is adapted to receive a disposable sleeve or bag that contains the collected waste. In another embodiment, the lid 104 includes a rectangular member with a center opening. The center opening is adapted to receive a plastic cover that moves with the lid 104, but is removable. The waste bin 214 is adapted to receive a plastic pan that mates with the removable plastic cover. When the waste bin 214 is to be cleaned of animal waste, the plastic pan, along with the plastic cover, are removed as a unit from the base 102 and the lid 104, respectively.

Figure 2:
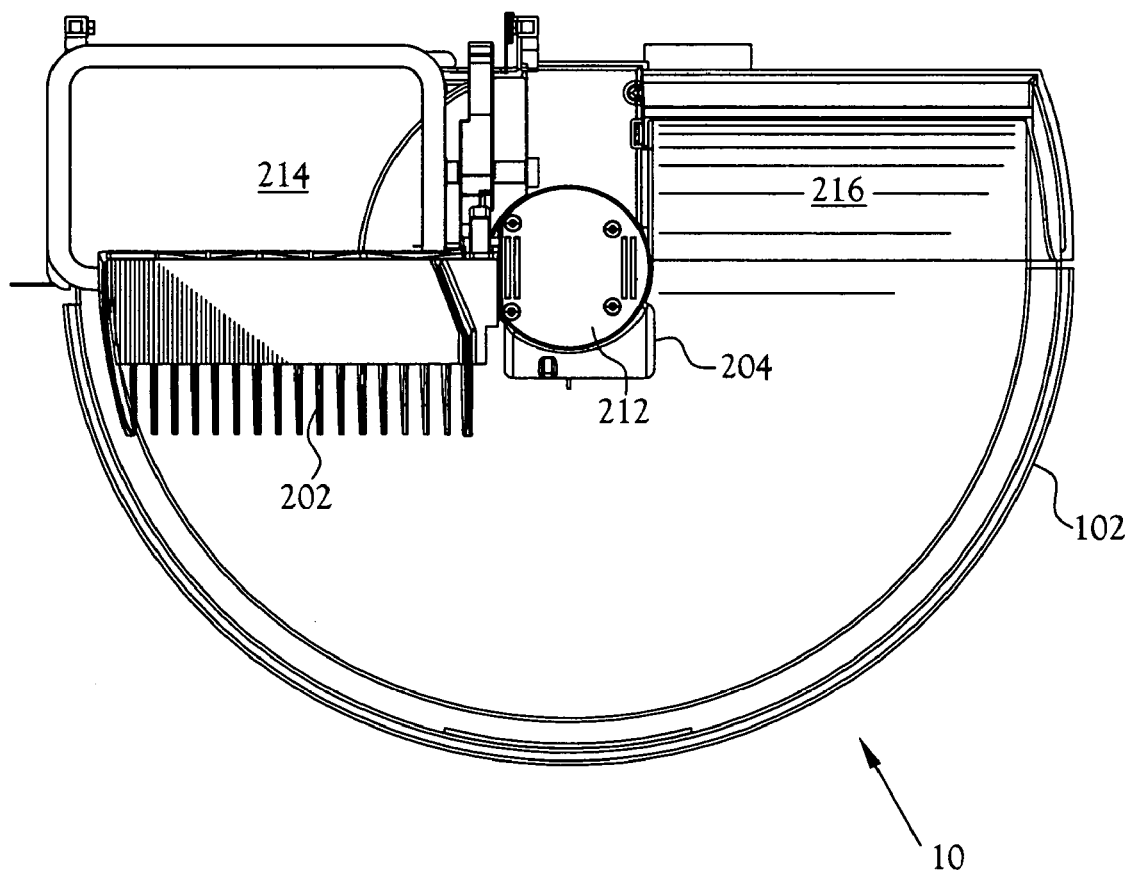
FIG. 2 is a cut-away plan view of one embodiment of a self-cleaning litter box.

FIG. 2 illustrates a plan view of one embodiment of the self-cleaning litter box 10 with the cover 104 removed, thereby exposing the waste bin 214. In the center of the circle of which the base 102 partially forms is a turret 212. In other words, the base 102 forms a partial circle when viewed from the top. The turret 212 is in the center point of that circle. The turret 212 rotates about a vertical axis of the base 102. Attached to the turret 212 is a rake 202 that sweeps across the inside of the base 102. In the illustrated embodiment, the turret 212 is at the rest, or dump, position adjacent the waste bin 214 and the rake 202 is in the mid position. For illustration purposes, the rake 202 is at the same position in FIG. 1; however, FIG. 1 does not show the cover 104 in the open position as would be expected with the rake 202 in the mid position and the turret 212 in the dump position. Opposite the dump position is a turning, or scooping, region 216, where the bottom and back surfaces of the base 102 curve up. The scooping region 216 allows the rake 202, at the full forward position, to rotate about its longitudinal axis after sweeping the animal waste in the litter box 10. Visible adjacent the turret 212 is the rake motor 204, which is carried by and rotates with the turret 212.

Figure 3:
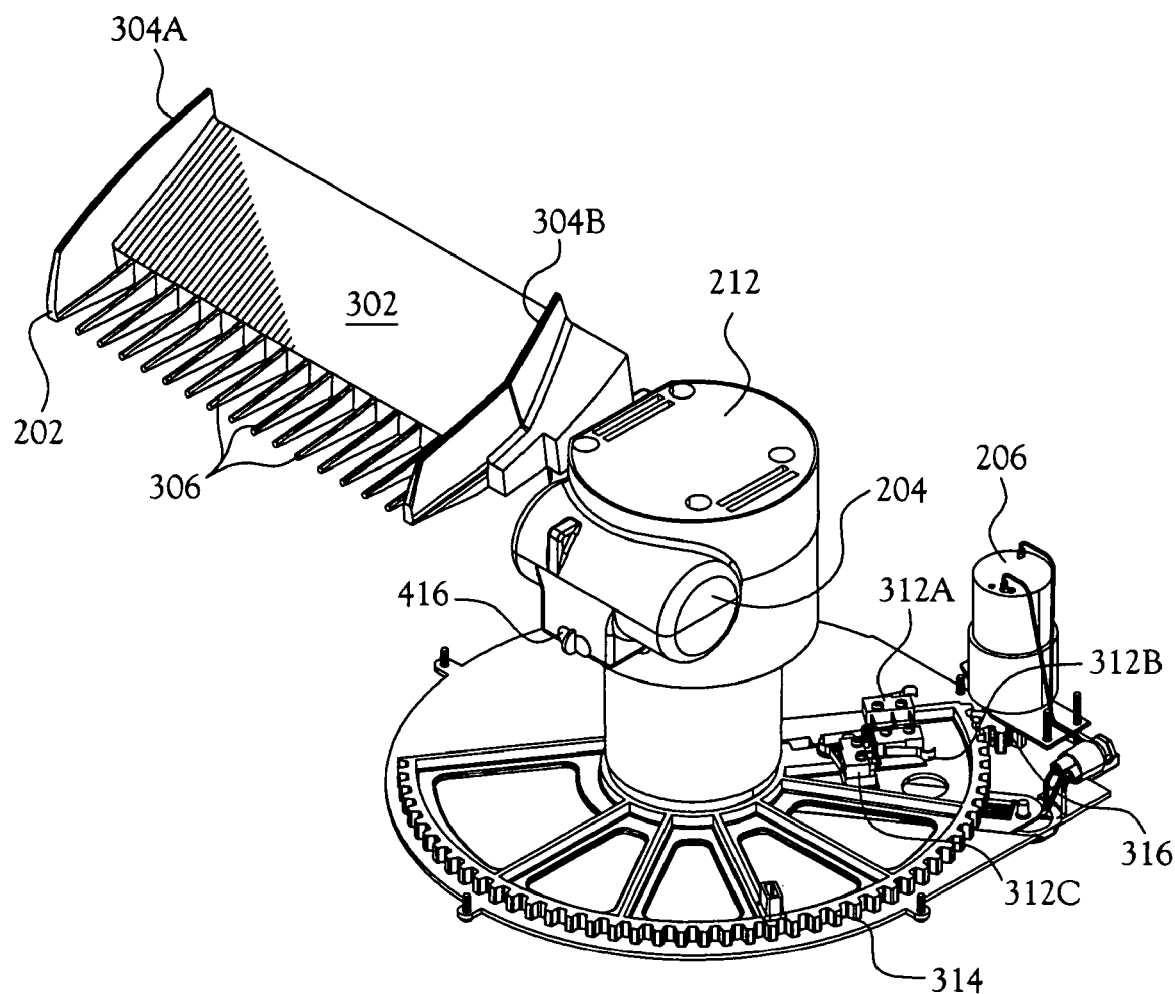
FIG. 3 is a cut-away perspective view of one embodiment of a rake assembly.

FIG. 3 illustrates a perspective view of one embodiment of the rake 202 and the turret 212 and its drive mechanism. In the illustrated embodiment, a turret motor 206 has a drive spur gear 316 that engages a turret gear 314 that causes the rake 202 to sweep through the base 102. Attached to the turret gear 314 are three turret limit switches 312A, 312B, 312C, that detect the turret 212 in the dump, mid, and scoop positions. The limit switches 312 engage tabs 4002, 4004, 4006 (visible in FIG. 40) protruding from the bottom of the base 102 above the turret gear 314. In the illustrated embodiment, the limit switches 412A are snap action microswitches with a lever actuator. Three switches 312A, 312B, 312C are illustrated, one each for the rest, or dump, position 312A, the mid position 312C, and the scoop position 312B.

The rake 202 has tines 306 that comb the litter in the base 102. On the outboard side of the rake 202 is an outboard guide, or wall, 304A, and on the inboard side of the rake 202 is an inboard guide, or wall, 304B. Between the guides 304 and adjacent the tines 306 is a waste support member, or a flat member, 302. The guides 304 and the flat member 302 provide a channel, or chute, for holding collected waste and for dumping the waste into the waste bin 214. The rake 202 is illustrated in the mid position, that is, with the tines 306 and flat member 302 substantially horizontal, such that any waste collected by the rake 202 is supported by the rake 202.

The litter box 10 operates by monitoring for an animal entering and then leaving the litter box 10. In the illustrated embodiment, an animal sensor 416 is mounted on the turret 212. A specified time after the animal leaves the litter box 10, the turret 212 rotates, causing the rake 102 to sweep through the litter, pushing any waste in front of the rake 202. When the rake 202 reaches the turning region 216, at the full forward position, the rake 202 stops and then rotates about its longitudinal axis until the rake 202 reaches a mid position in which the rake tines 306 and flat member 302 are substantially horizontal and carry the collected waste. The turret 212 then moves the rake 202 in reverse back to the dump position. At the dump position, the rake 202 rotates to the full up position, thereby causing the collected waste to drop into the waste bin 214. In one embodiment, the rake 202 then returns to the home position. In another embodiment, the rake 202 returns to the mid position and the turret 212 moves the rake 202 back to the scoop position. At the scoop position, the rake 202 rotates to the down position and the turret 212 sweeps the rake 202 in reverse through the litter. When the turret 212 reaches the mid position, the rake 202 is rotated to the mid position and the turret 212 continues to the rest, or dump position. When the turret 212 reaches the rest position, the rake 202 rotates to the down position.

Figure 4:
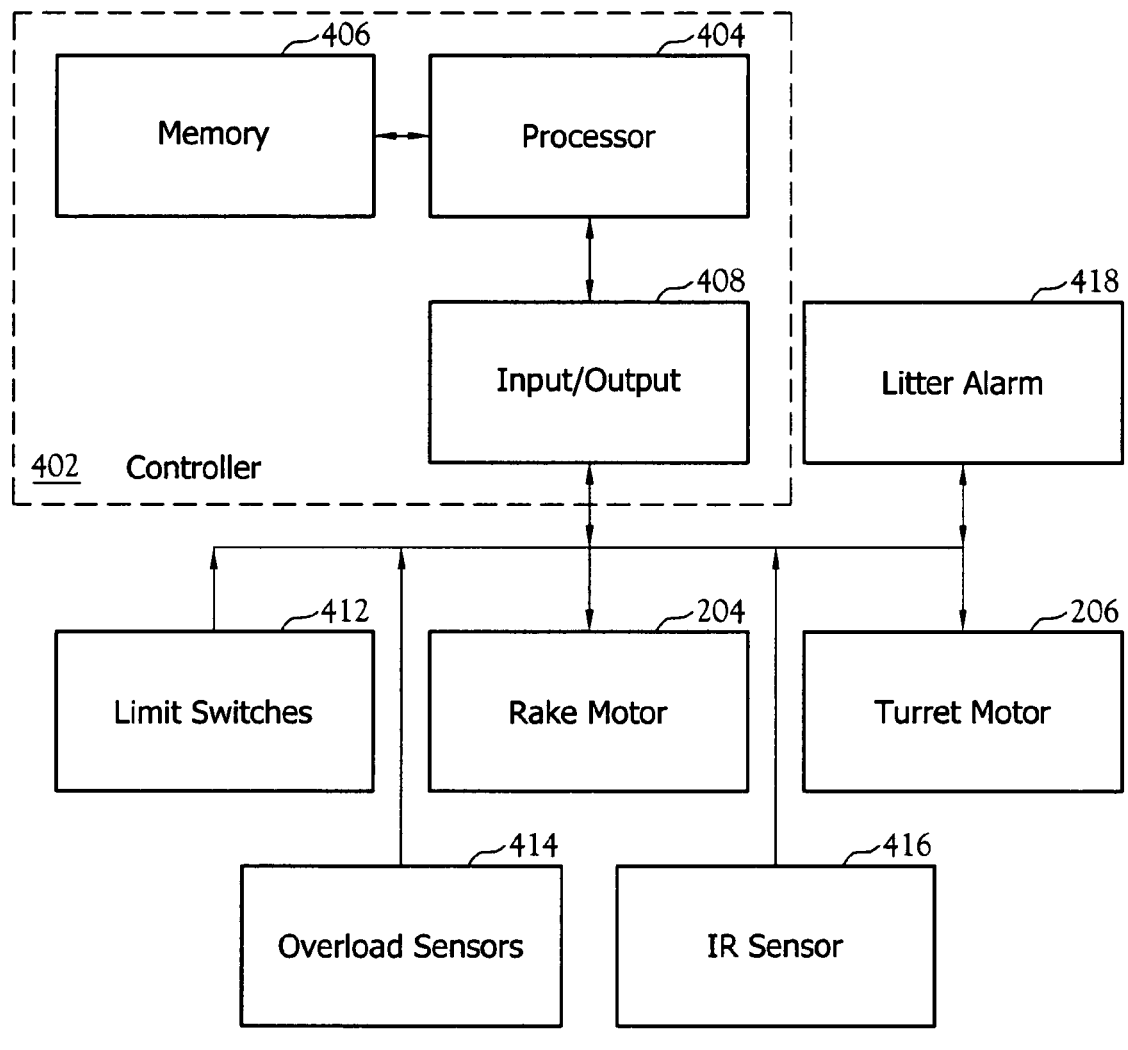
FIG. 4 is a block diagram of one embodiment of a self-cleaning litter box.

FIG. 4 illustrates a block diagram of one embodiment of the self-cleaning litter box 10. A controller 402 includes a processor 404 that communicates with a memory 406 and an input/output (I/O) module 408. The I/O module 404 communicates with the hardware of the self-cleaning mechanism, including the limit switches 412, the rake motor 204, the turret motor 206, the overload sensors 414, and the infrared (IR) sensor 416. In one embodiment, the I/O module 404 includes multiple ports, at least one port communicating with a hardware device.

The limit switches 412 are devices that detect the physical position of the limits of motion for the rake 202 to prevent over-travel of the rake 202. In various embodiments, the limit switches 412 are based on magnetic switches, mechanically actuated switches, optical sensors, or other position indicating means. The limit switches 412 include sensors for the rotation of the rake 202 by the rake motor 204 and for the sweep of the rake 202 by the turret motor 206.

The overload sensors 414 are devices specific to each motor 204, 206 that monitors for an overload condition on that motor 204, 206. In one embodiment, each of the overload sensors 414 monitors the motor current for its respective motor 204, 206 for an excessive current draw. In one embodiment, the voltage drop across a resistor provides data to the processor 404 regarding the current flowing through the motor.

The IR sensor 416 is a device that detects the presence of an animal in the litter box 10. In the illustrated embodiment, the IR sensor 416 uses the detection of an infrared beam to determine that no animal is using the litter box 10. In one embodiment, the IR sensor 416 is mounted either on or near the turret 212 and is aimed at a reflector attached to the sidewall of the base 102. In one embodiment, the IR sensor 416 includes a transmitter and a receiver mounted such that the transmitter sends an infrared beam to a reflector mounted on a facing wall of the base 102. The receiver is positioned to receive the reflected infrared beam. In another embodiment, a barrier is positioned between the transmitter and receiver in order to provide optical isolation and prevent the receiver from detecting the transmitter. In another embodiment, the IR sensor 416 operates at a wavelength other than infrared. Those skilled in the art will recognize that other wavelengths than infrared can be used without departing from the spirit and scope of the present invention. Accordingly, although the animal detection sensor 416 is referred herein as an IR sensor 416, it must be understood that the device is not limited to operate only in the infrared.

The litter alarm 418 provides audible beeps under control of the controller 402. In one embodiment, the litter alarm 418 provides an alarm notifying the operator of the state of the litter in the box 10. In another embodiment, the litter alarm 418 beeps when the litter box 10 is initialized and ready for use by the animal.

As used herein, the controller 402 should be broadly construed to mean any computer or component thereof that executes software. The controller 402 includes a memory medium 406 that stores software, a processor 404 that executes the software, and input/output (I/O) units 408 for communicating with external devices. Those skilled in the art will recognize that the memory medium 406 associated with the controller 402 can be either internal or external to the processor 402 without departing from the scope and spirit of the present invention.

In one embodiment the controller 402 is a general purpose computer, in another embodiment, it is a specialized device for implementing the functions of the invention. Those skilled in the art will recognize that the controller 402 includes an input component 408, an output component 408, a storage component 406, and a processing component 404. The input component receives input from external devices, such as the limit switches 412, the overload sensors 418, and the infrared (IR) sensor 420. The output component sends output to external devices, such as the rake motor 204, the turret motor 206, and the infrared (IR) sensor 420. The storage component 406 stores data and program code. In one embodiment, the storage component 406 includes random access memory. In another embodiment, the storage component 406 includes non-volatile memory, such as floppy disks, hard disks, and writeable optical disks. The processing component 404 executes the instructions included in the software and routines.

In one embodiment, each of the functions identified in the figures are performed by one or more software routines executed by the controller 402. In another embodiment, one or more of the functions identified are performed by hardware and the remainder of the functions are performed by one or more software routines run by the controller 402. In still another embodiment, the functions are implemented with hardware, with the controller 402 providing routing and control of the entire integrated system 10.

The processor 404 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function. Those skilled in the art will recognize that it is possible to program a general-purpose computer or a specialized device to implement the invention.

Figure 5:
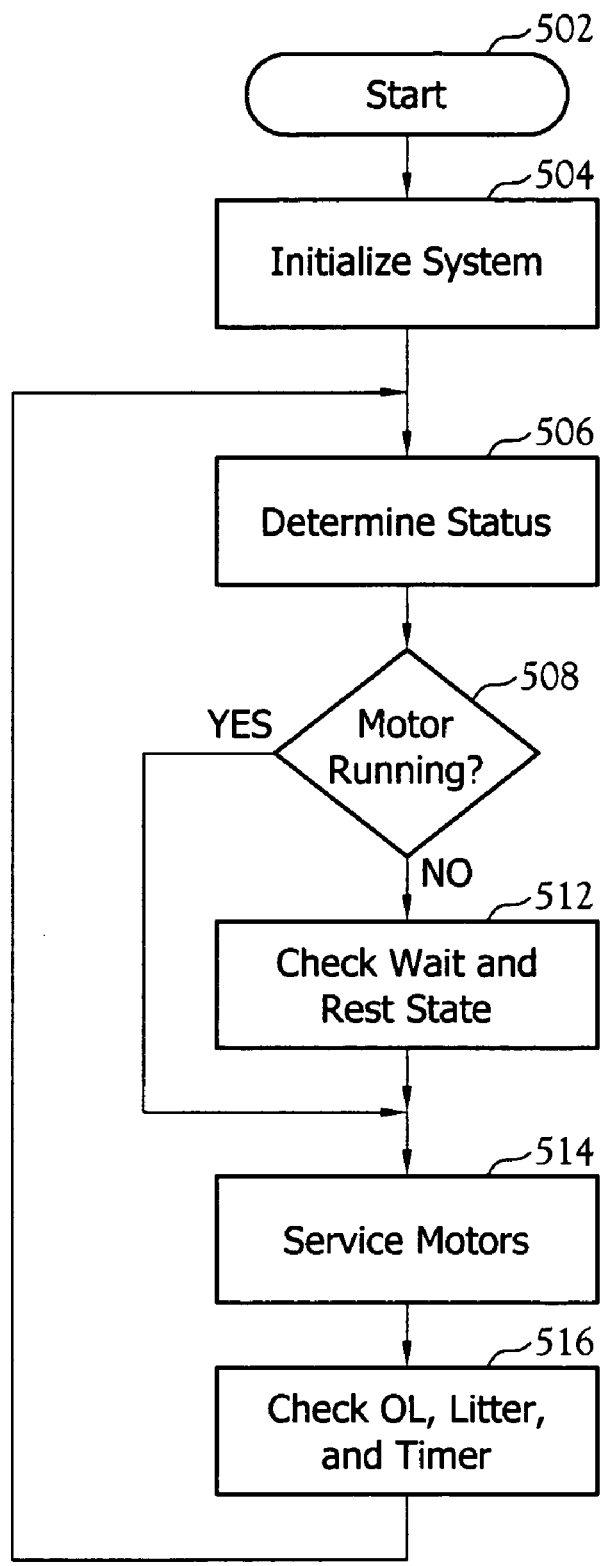
FIG. 5 is a flow diagram of one embodiment of the method for controlling the self-cleaning litter box.
Figure 6:
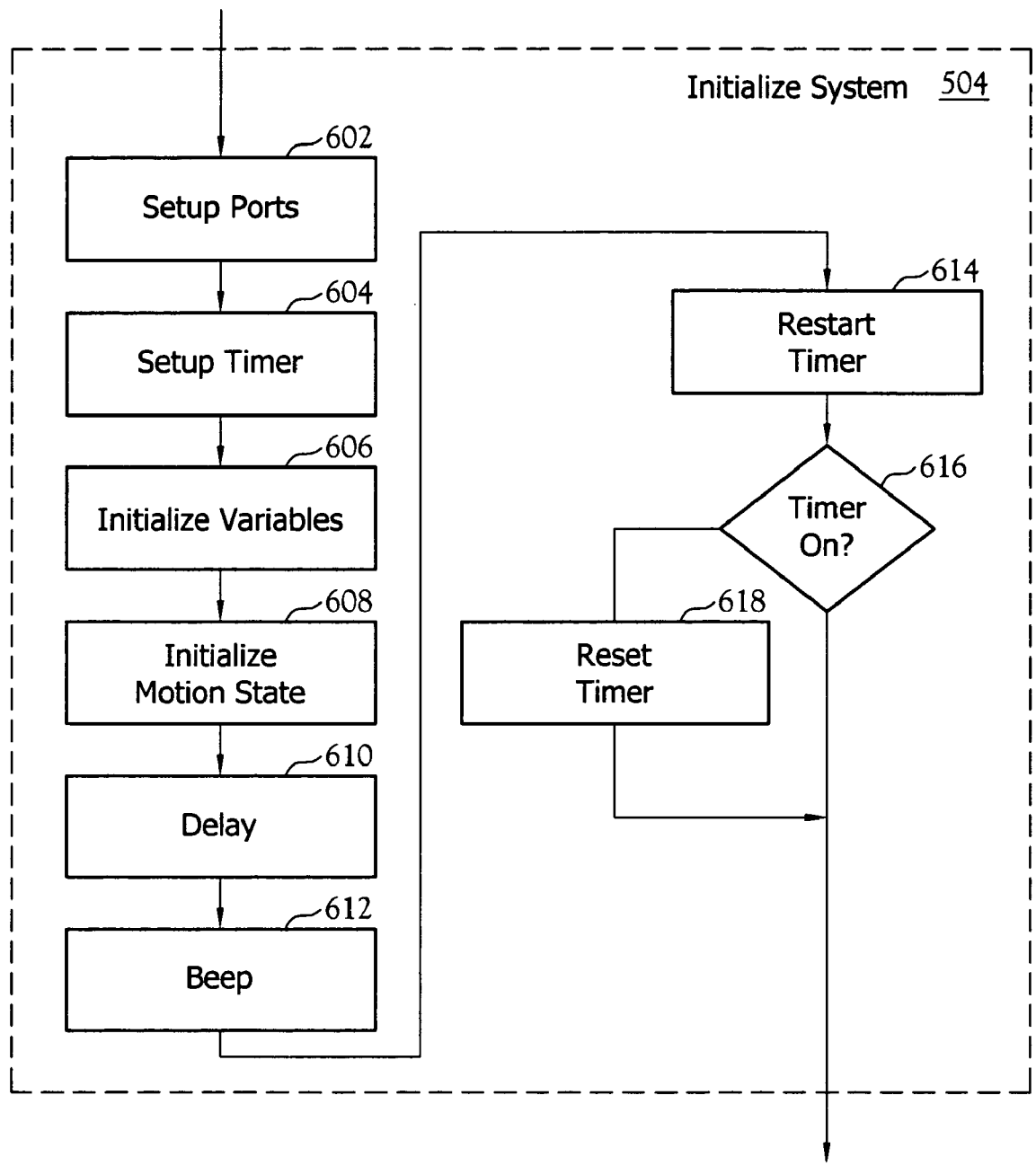
FIG. 6 is a flow diagram of one embodiment of the method for initializing the system.
Figure 7:
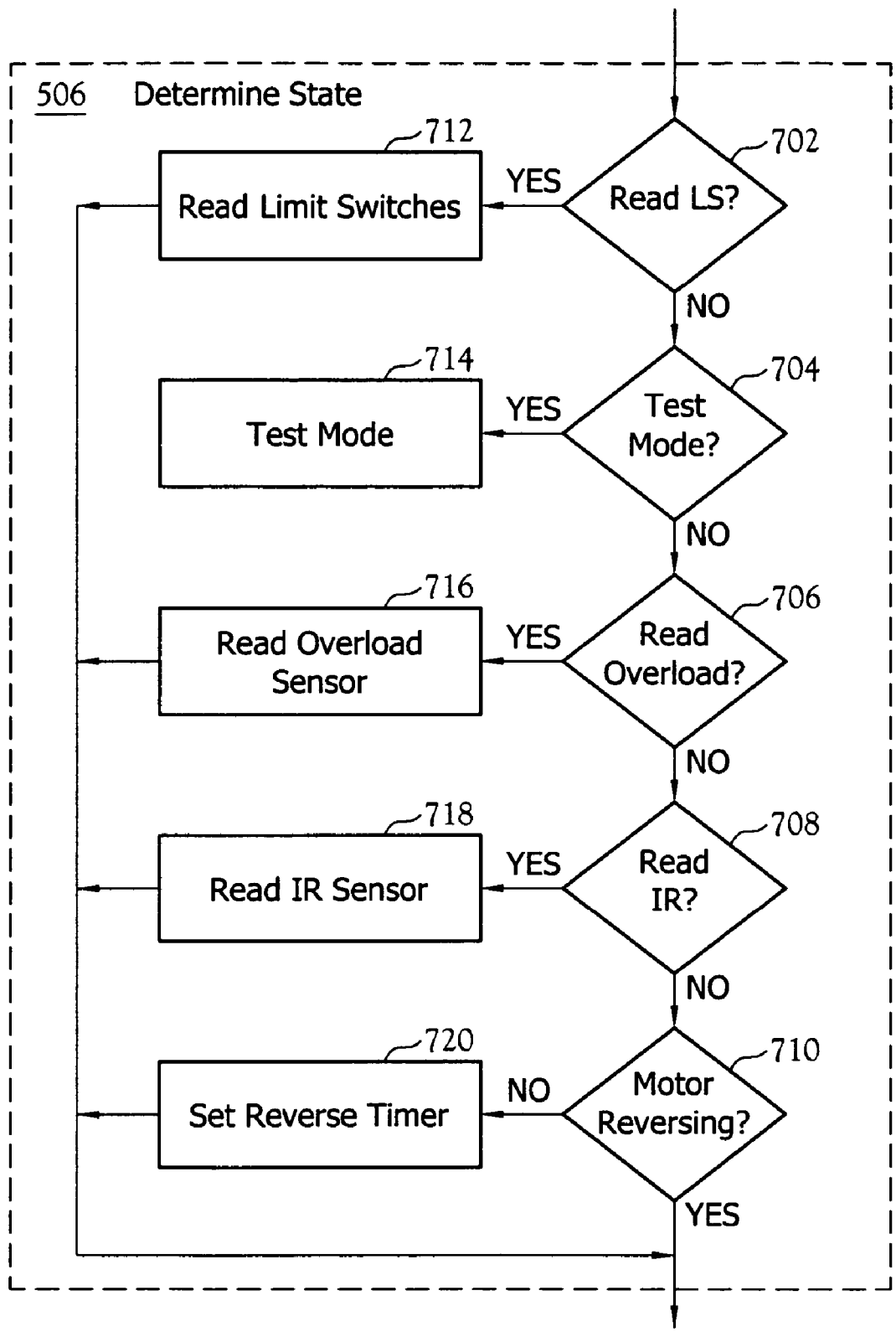
FIG. 7 is a flow diagram of one embodiment of the method for determining the system state.
Figure 12:
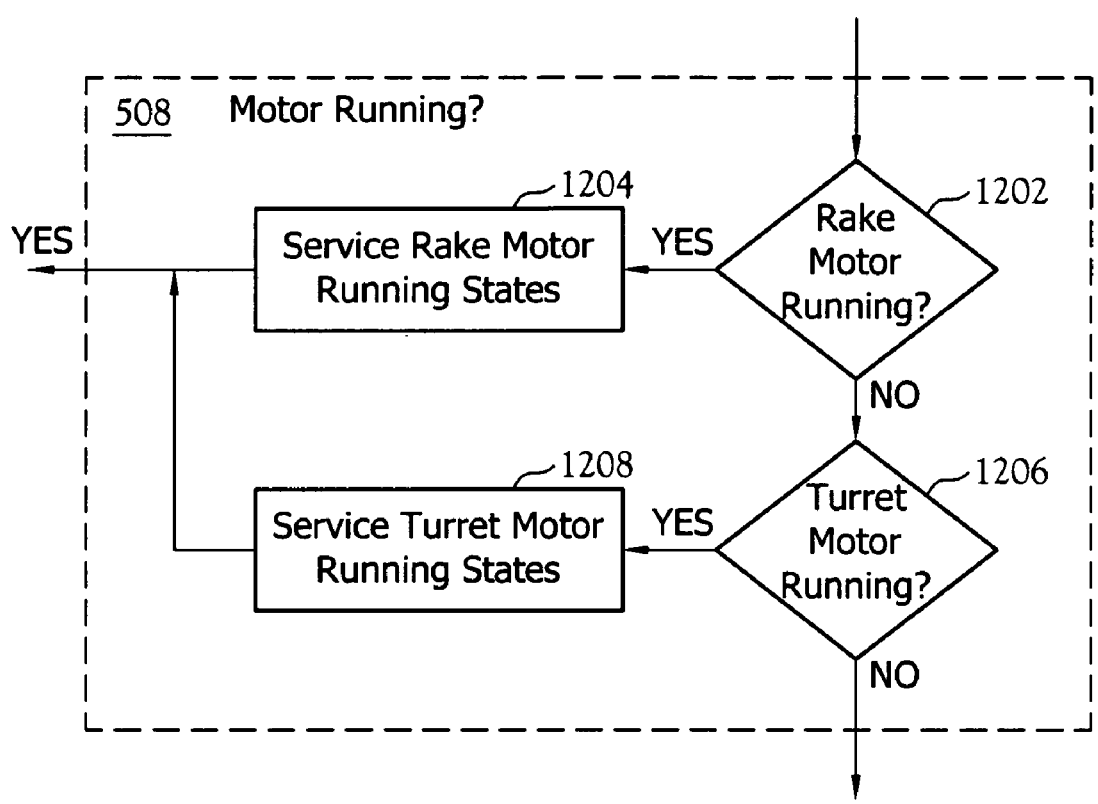
FIG. 12 is a flow diagram of one embodiment of the method for testing whether a motor is running and servicing the motor running states.
Figure 15:
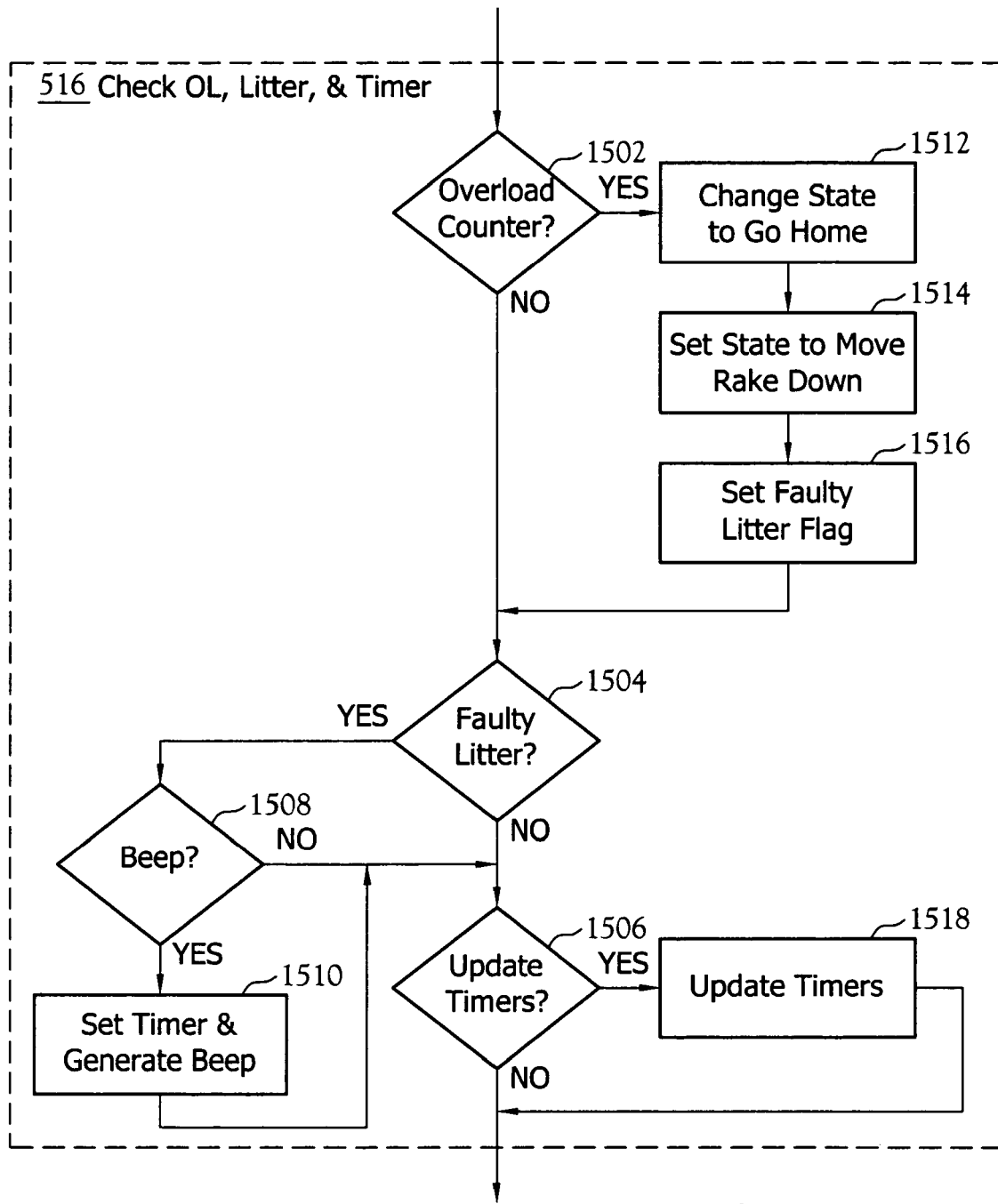
FIG. 15 is a flow diagram of one embodiment of the method for checking the overload, litter, and timers.
Figure 17:
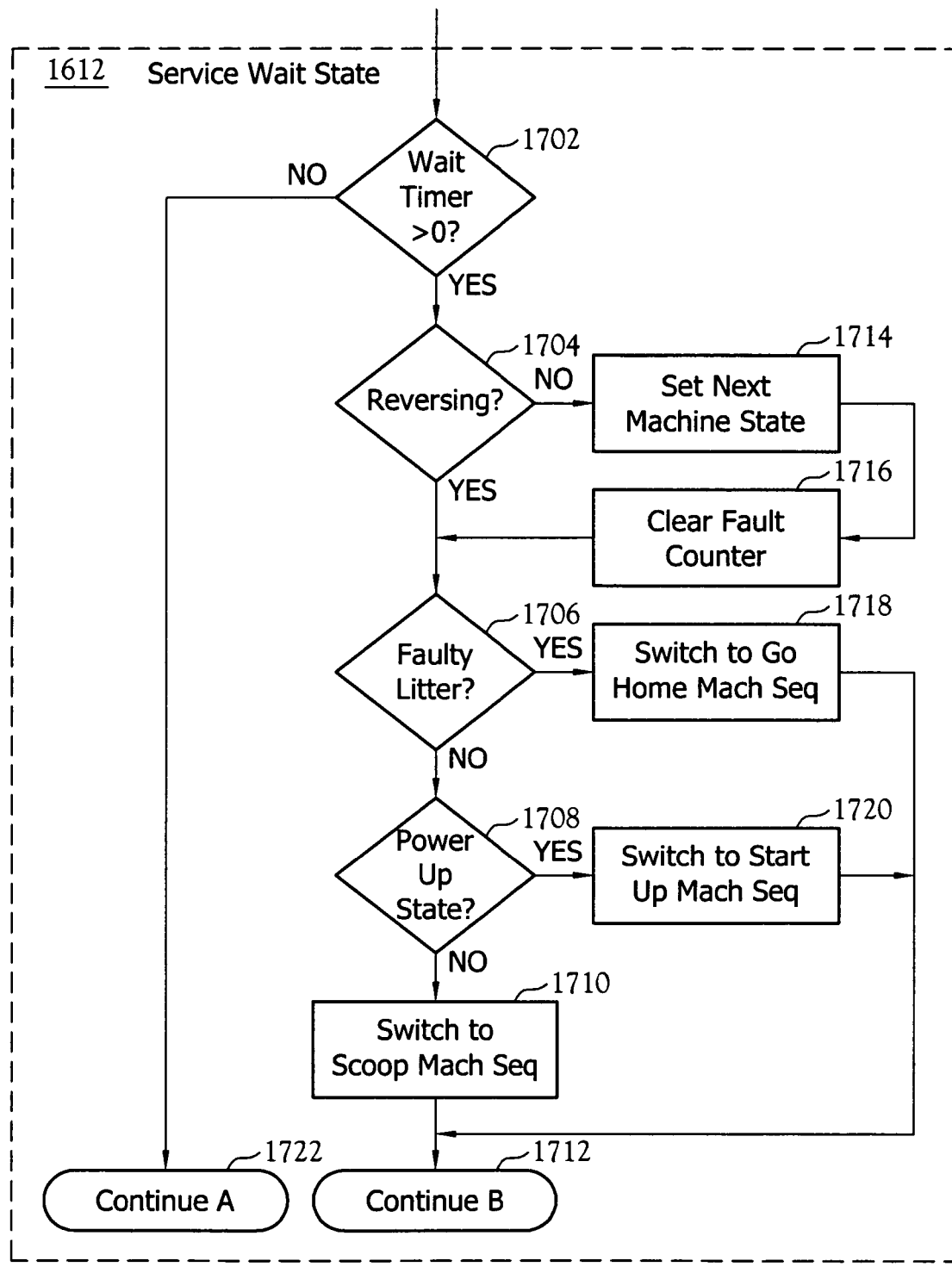
FIG. 17 is a flow diagram of one embodiment of the method for checking the WAIT and REST state.
Figure 20:
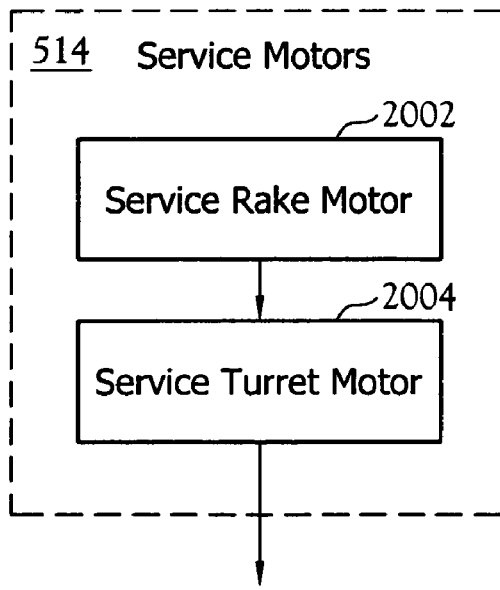
FIG. 20 is a flow diagram of one embodiment of the method for servicing the motors.

FIG. 5 illustrates a flow diagram of one embodiment of the method for controlling the self-cleaning litter box 10. Upon receiving power, the controller 402 starts 502. The control system is then initialized 504. FIG. 6 illustrates a flow diagram of one embodiment of the method for initializing the system 504. After initializing 504, the software determines the status 506 of the hardware. FIG. 7 illustrates a flow diagram of one embodiment of the method for determining the system status 506. The step of determining the status 506 is the first step in a loop that is continuously executed while the system 10 is in operation. After the system status is determined 506, the software checks for a running motor 508. In one embodiment, the litter box 10 has two motors, a rake motor 204 and a turret motor 206. FIG. 12 illustrates a flow diagram of one embodiment of the method for testing whether a motor is running and servicing the motor running states 508. If neither motor is running, the next step is to check for a WAIT or REST state 512. FIG. 17 illustrates a flow diagram of one embodiment of the method for checking the WAIT and REST state 512. The software next runs a routine for servicing the motors 514. FIG. 20 illustrates a flow diagram of one embodiment of the method for servicing the motors 514. After the motors are serviced 514, the next step is to check the overload, litter, and timers 516. FIG. 15 illustrates a flow diagram of one embodiment of the method for checking the overload, litter, and timers

516. Checking the overload, litter, and timers 516 includes checking the overload counter to determine whether it exceeds a specified number, which in one embodiment is three overloads. This step 516 also includes checking for whether the litter is faulty, and issuing a beep when the litter is determined to be faulty. This step 516 also includes checking the time to determine whether it is time to update the various timers.

After checking the overload, litter, and timers 516, the software loops back to the step of determining the machine state 506. This primary loop is executed repeatedly while the system 10 is in operation. In one embodiment, the primary loop executes continuously in a linear fashion. In another embodiment, the primary loop executes a specified number of times per second.

Figure 27:
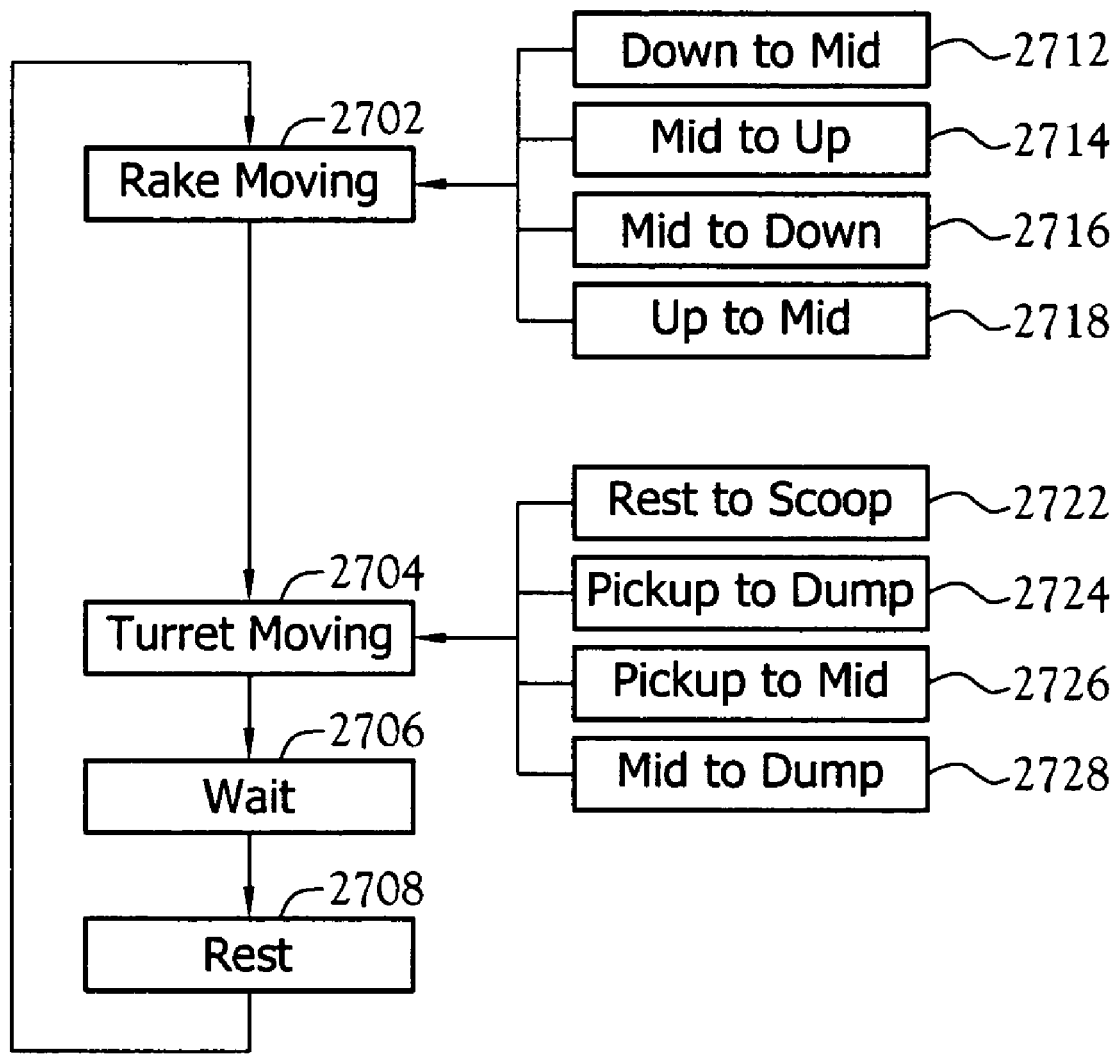
FIG. 27 is a block diagram showing one embodiment of the machine states.

The routines illustrated in FIG. 5 and following use various timers, counters, and flags to track the status and operation of the litter box 10. In addition, the software keeps track of various machine states. FIG. 25 illustrates a table of flags used in one embodiment of the software. FIG. 26 illustrates a table of timers and counters used in one embodiment of the software. FIG. 27 illustrates a block diagram showing one embodiment of the machine states.

Figure 28:
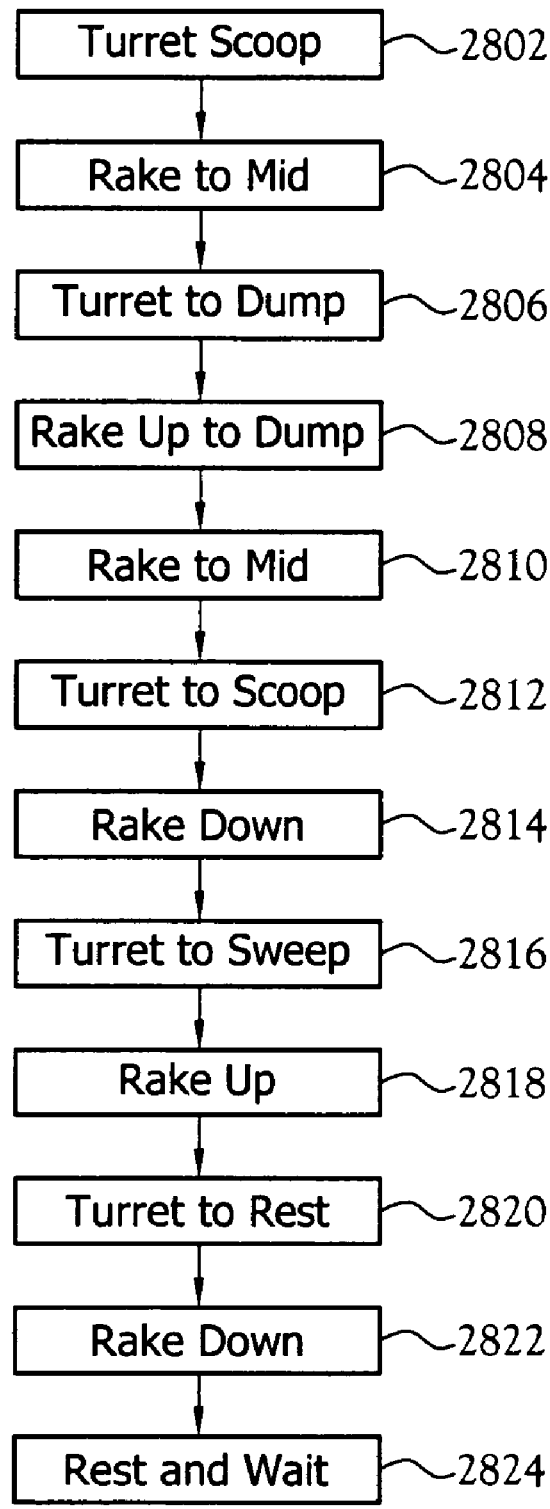
FIG. 28 is a block diagram showing one embodiment of the steps for the scoop sequence.
Figure 29:
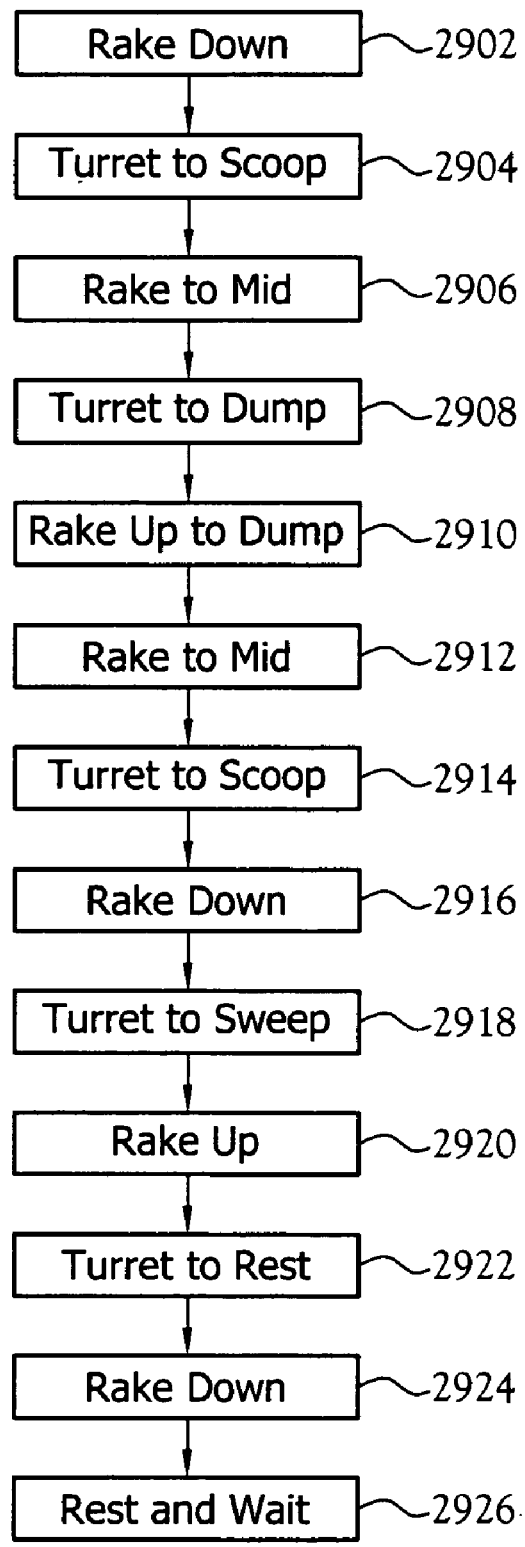
FIG. 29 is a block diagram showing one embodiment of the steps for the start up sequence.
Figure 30:
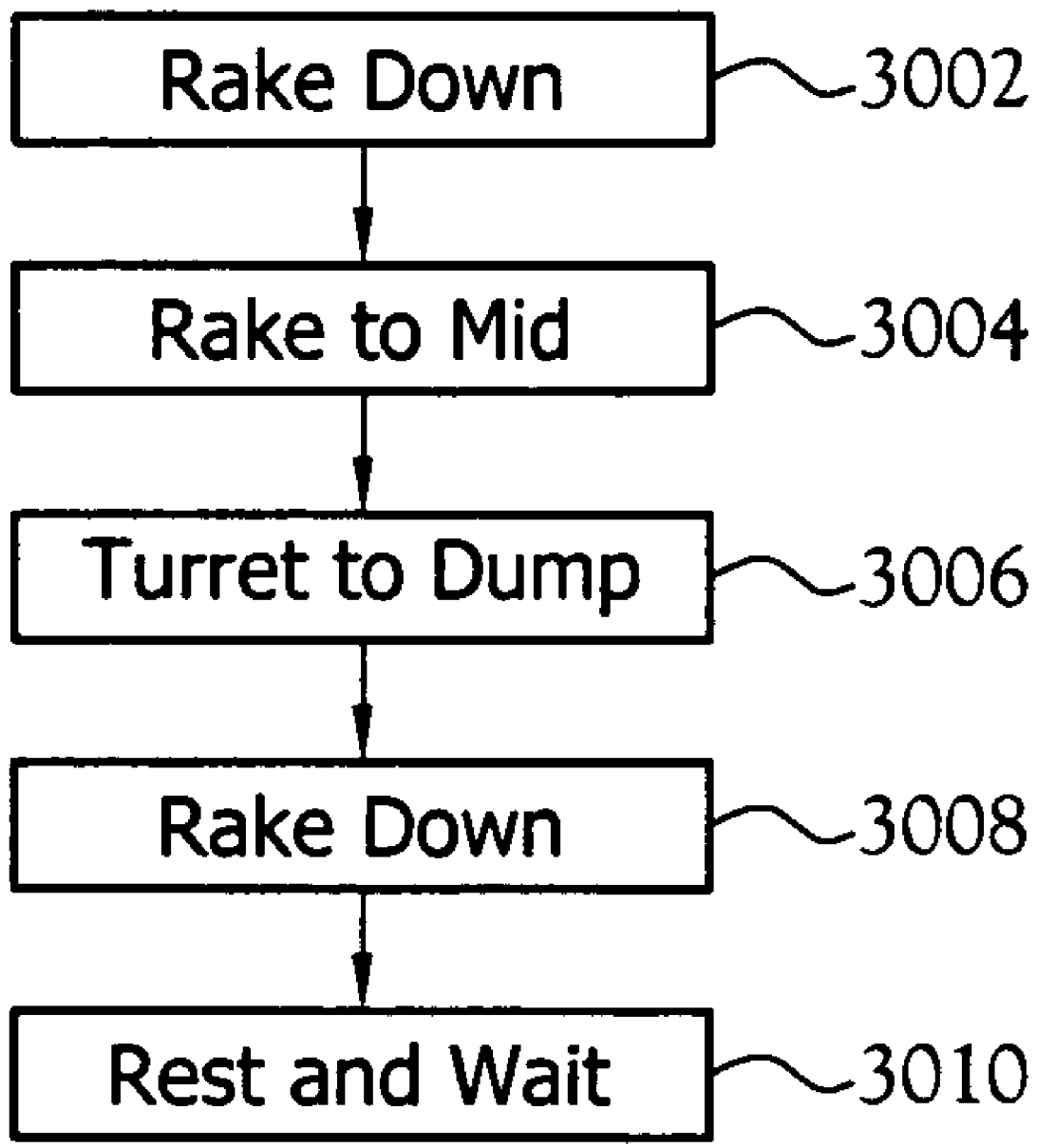
FIG. 30 is a block diagram showing one embodiment of the steps for the go home sequence.

The litter box 10 includes various machine sequences. These machine sequences vary for, and are specific to, each machine state. FIG. 28 illustrates a block diagram showing one embodiment of the steps for the scoop sequence. FIG. 29 illustrates a block diagram showing one embodiment of the steps for the start up sequence. FIG. 30 illustrates a block diagram showing one embodiment of the steps for the go home sequence.

FIG. 6 illustrates a flow diagram of one embodiment of the method for initializing the system 504. The initializing steps include setup ports 602 that communicate with the litter box 10 hardware, setup timers 604, and initialize variables 606. The initialization routine 504 then initializes the motion state machine to lower the rake 608. The routine 504 then has a delay 610 to allow the controller 402 to power up completely. In one embodiment, the delay 610 is ½ second. After the delay 610, a beep 612 alerts the user that the system initialization 504 is complete. In one embodiment, the beep 612 is a 100 millisecond tone. After emitting a beep 612, a watchdog timer is restarted 614. The IR timer is checked 616 to determine that it is counting down the time to scoop. In one embodiment, the IR timer counts down the time since an animal was last in the litter box 10. In one embodiment, the IR timer counts down from 15 minutes, which allows time for the animal to leave the litter box 10 and remove itself from the immediate vicinity of the box 10, thereby ensuring that the animal will not be disturbed by the litter box 10 initiating the self-cleaning process. If the IR timer is counting down 616, then the initializing routine 504 exits. If the timer is not counting down 616, then the IR timer is reset 618 and the initializing routine 504 exits.

Figure 8:
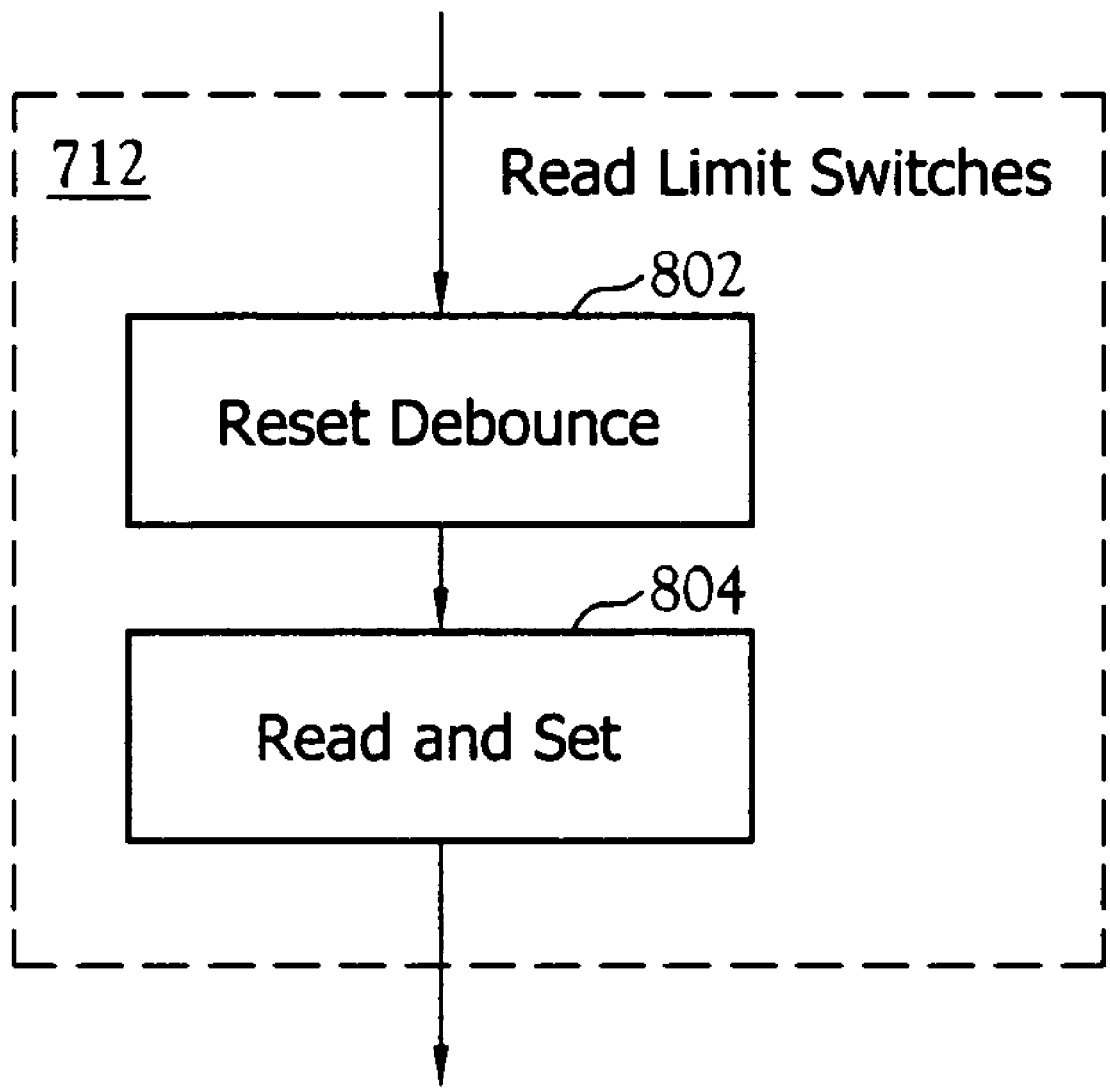
FIG. 8 is a flow diagram of one embodiment of the method for reading the limit switches.
Figure 10:
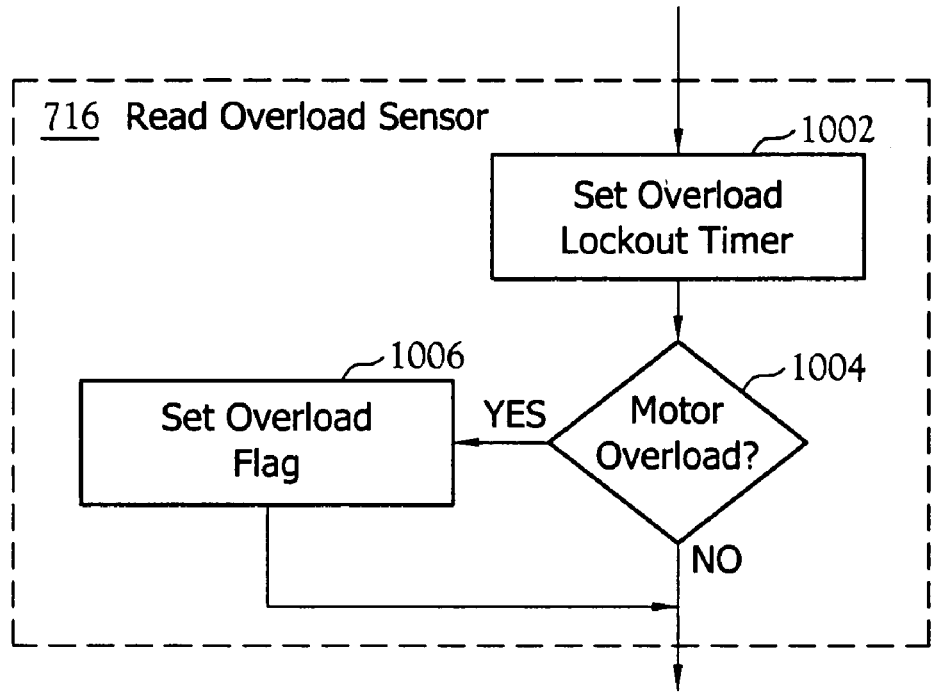
FIG. 10 is a flow diagram of one embodiment of the method for reading the overload sensor.
Figure 11:
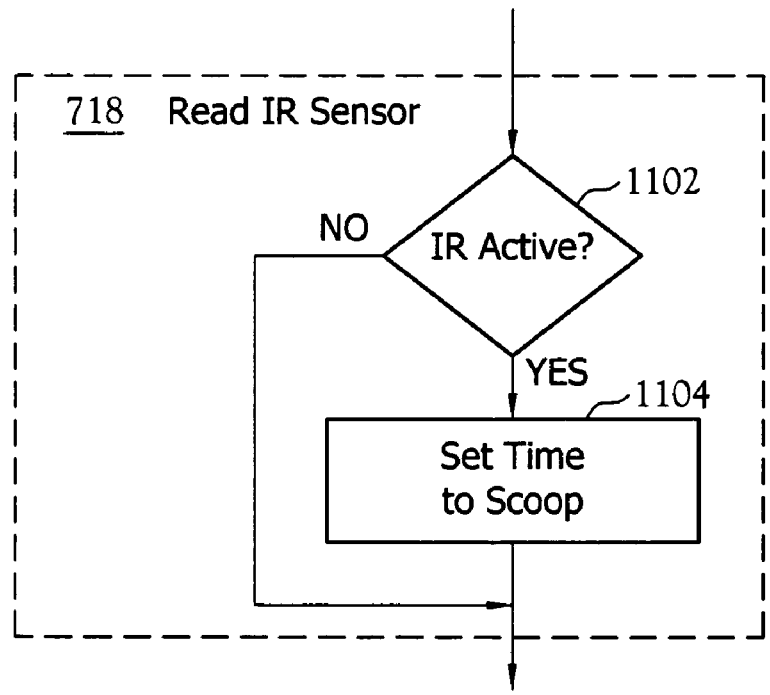
FIG. 11 is a flow diagram of one embodiment of the method for reading the infrared sensor.

FIG. 7 illustrates a flow diagram of one embodiment of the method for determining the system status 506. The routine to determine the system status 506 includes five hardware checks 702 & 712, 704 & 714, 706 & 716, 708 & 718, 710 & 720 that, in one embodiment, are performed in any order, not just that identified in FIG. 7. One hardware check is whether it is time to read the limit switches (LS) 702. If it is time to read the limit switches 702, then the limit switches 412 are read 712. FIG. 8 illustrates a flow diagram of one embodiment of the method for reading the limit switches 712. A second hardware check is whether the system is under test 704. If the system is under test 704, then the routine for the test mode 714 is executed. In the illustrated embodiment, once the test mode routine 714 is entered, the litter box 10 must be reset to operate the box 10 outside the test mode routine 714. FIG. 9 illustrates a flow diagram of one embodiment of the method for the test mode 714. A third hardware check is whether it is time to read the motor overload sensor 706. If so, then the overload sensor 414 is read 716. FIG. 10 illustrates a flow diagram of one embodiment of the method for reading the overload sensor 716. A fourth hardware check is whether it is time to read the IR sensor 708. If so, then the IR sensor 416 is read 718. FIG. 11 illustrates a flow diagram of one embodiment of the method for reading the infrared sensor 718. A fifth hardware check is whether either of the motors 204, 206 are reversing 710. If one of the motors 204, 206 is reversing 710, then the reverse timer is set 720. In one embodiment, the reverse timer is set for two seconds.

FIG. 8 illustrates a flow diagram of one embodiment of the method for reading the limit switches 712. The first step is to reset the debounce 802. In one embodiment, the switch debounce is set to 40 milliseconds to ensure that any readings of the limit switch position are not affected by switch bounce. The port is then read and flags are set 804. In one embodiment, the limit switches 412 are connected to one or more ports in the I/O module 408. These ports are read, or queried, by the processor 404 and the port status is stored in flags or variables. In one embodiment of the routine to read and set 804, all the ports associated with the limit switches 412 are read and all the flags, or variables, associated with the limit switches 412 are set.

Figure 9A:
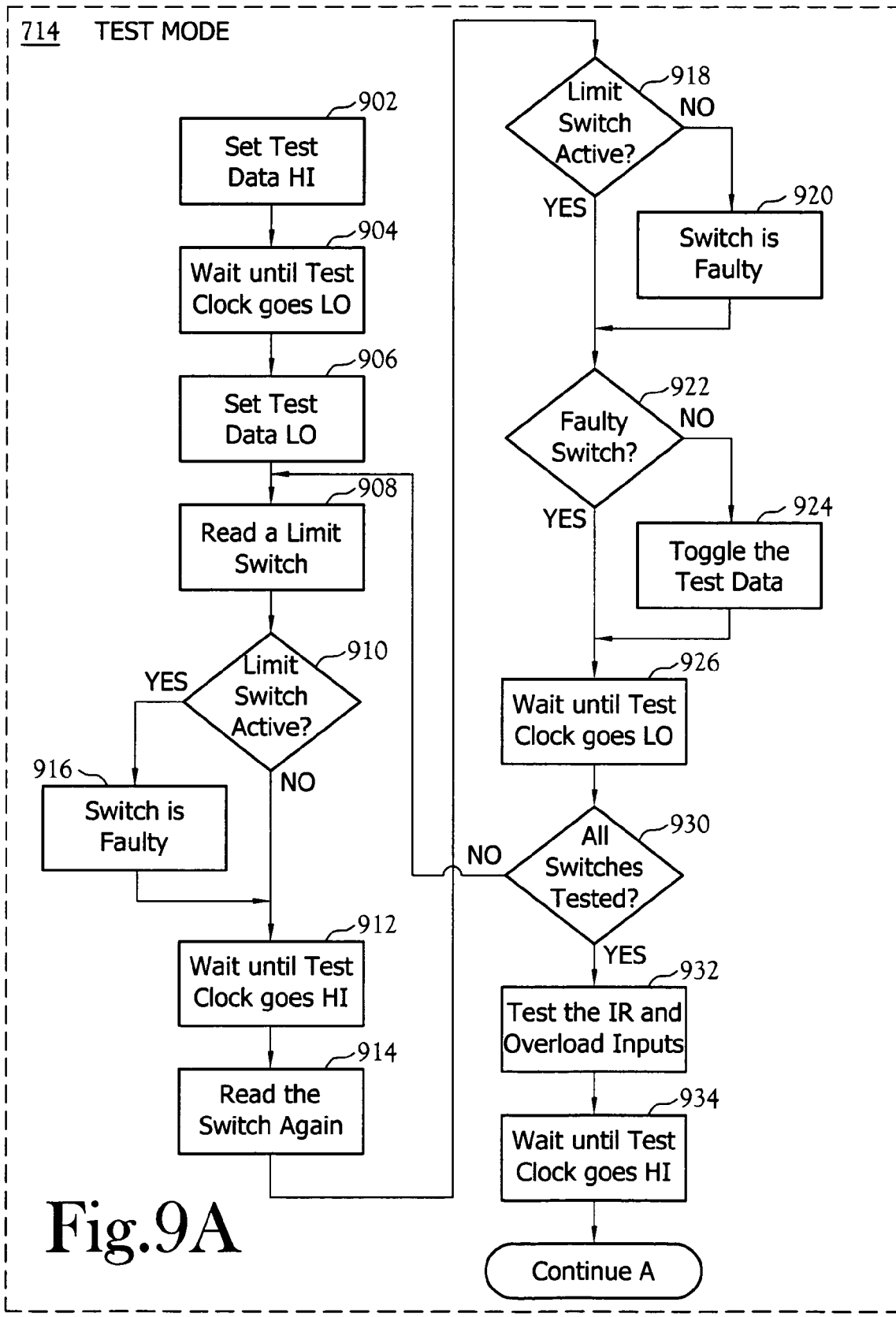
FIGS. 9A and 9B are flow diagrams of one embodiment of the method for the test mode.
Figure 9B:
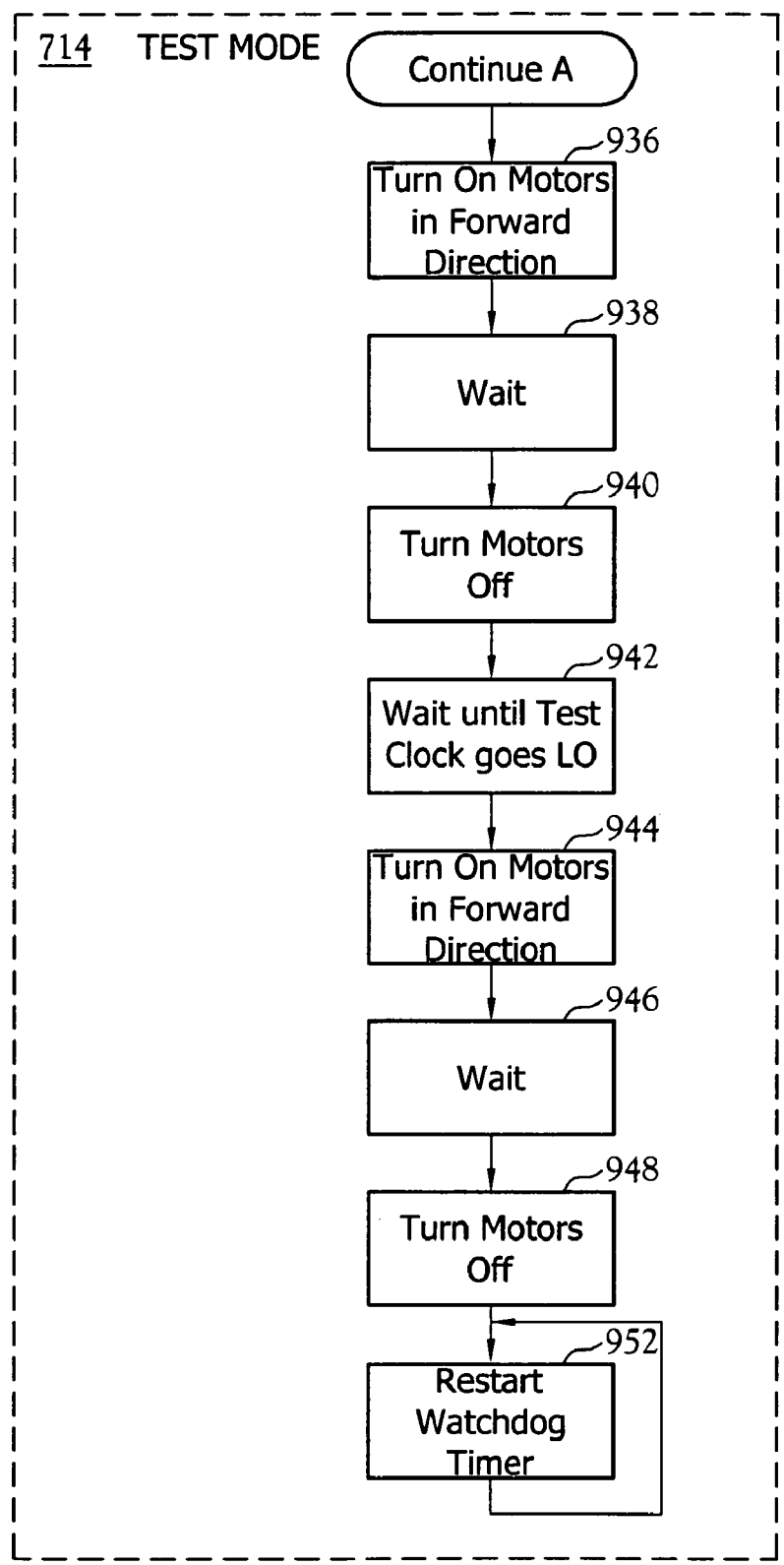

FIGS. 9A and 9B illustrate a flow diagram of one embodiment of the method for the test mode 714. The first steps in the routine for the test mode 714 is to set the test data High 902 and then wait until the test clock goes Low 904, after which the test data is set Low 906. The routine 714 then begins a loop to test all the limit switches 412. The first step of the loop is to read a limit switch 908. If the limit switch is active 910, the limit switch is flagged as faulty 916. If the limit switch is not active 910, the next step is to wait until the test clock goes High 912. The switch is read again 914 and if the limit switch is not active 918, the limit switch is flagged as faulty 920. If the limit switch is active 918, the next step is to decide whether the switch is faulty 922. If the limit switch is not faulty 922, then the test data is toggled 924. The next step is to wait until the test clock goes Low 926. If all the switches have not been tested 930, the loop repeats with step 908. If all the limit switches have been tested 930, then the next step is to test the IR and overload inputs 932. This step is substantially the same as the previous loop 908 to 930 where each input is tested.

The test mode routine 714 then waits until the test clock goes High 934 before turning on the motors in the forward direction 936 (shown on FIG. 9B). The routine 714 then waits 938 before turning the motors off 940. In one embodiment, the step of waiting 938 is a wait subroutine that pauses the routine 714 execution for five milliseconds. The routine 714 ten waits until the test clock goes Low 942, at which time the motors are turned on in the reverse direction 944 and the routine 714 waits 946 before turning the motors off 948. In one embodiment, the step of waiting 946 is a wait subroutine that pauses the routine 714 execution for five milliseconds. The final steps of the test mode routine 714 is to perform an infinite loop by continuously restarting the watchdog timer 952.

FIG. 10 illustrates a flow diagram of one embodiment of the method for reading the overload sensor 716. The first step is to set the overload lockout timer 1002. In one embodiment, the overload lockout timer is set to 100 milliseconds. After the overload lockout timer is set 1002, the overload sensor 414 is checked for a motor overload 1004. If there is an overload, the overload flag is set 1006. If there is no overload 1004, then the routine exits.

FIG. 11 illustrates a flow diagram of one embodiment of the method for reading the infrared sensor 718. The first step is to check to see if the infrared (IR) sensor 416 is active 1102. If the IR sensor 416 is not active 1102, then the routine 718 exits. If the IR sensor 416 is active 1102, then the time to scoop is set 1104. In one embodiment, the time to scoop is set 1104 by setting the IR timer to 15 minutes. With each pass through the primary loop, the IR timer is set to the specified time as long as the IR sensor 416 senses an animal in the litter box base 102. After the animal exits the base 102, the IR timer is not set and is permitted to time down, at which time the litter box 10 will be scooped.

Figure 13:
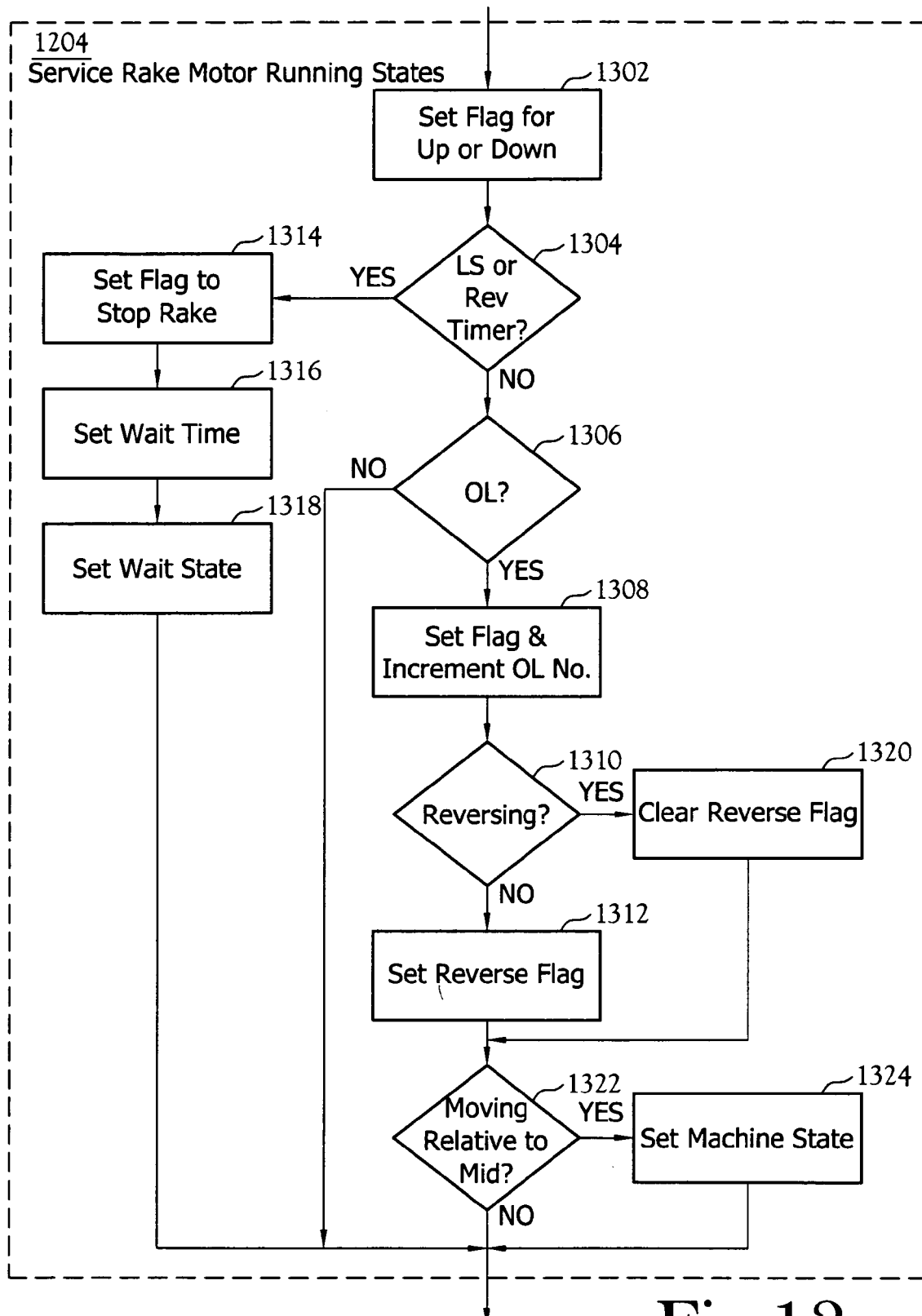
FIG. 13 is a flow diagram of one embodiment of the method for servicing the rake motor running states.
Figure 14:
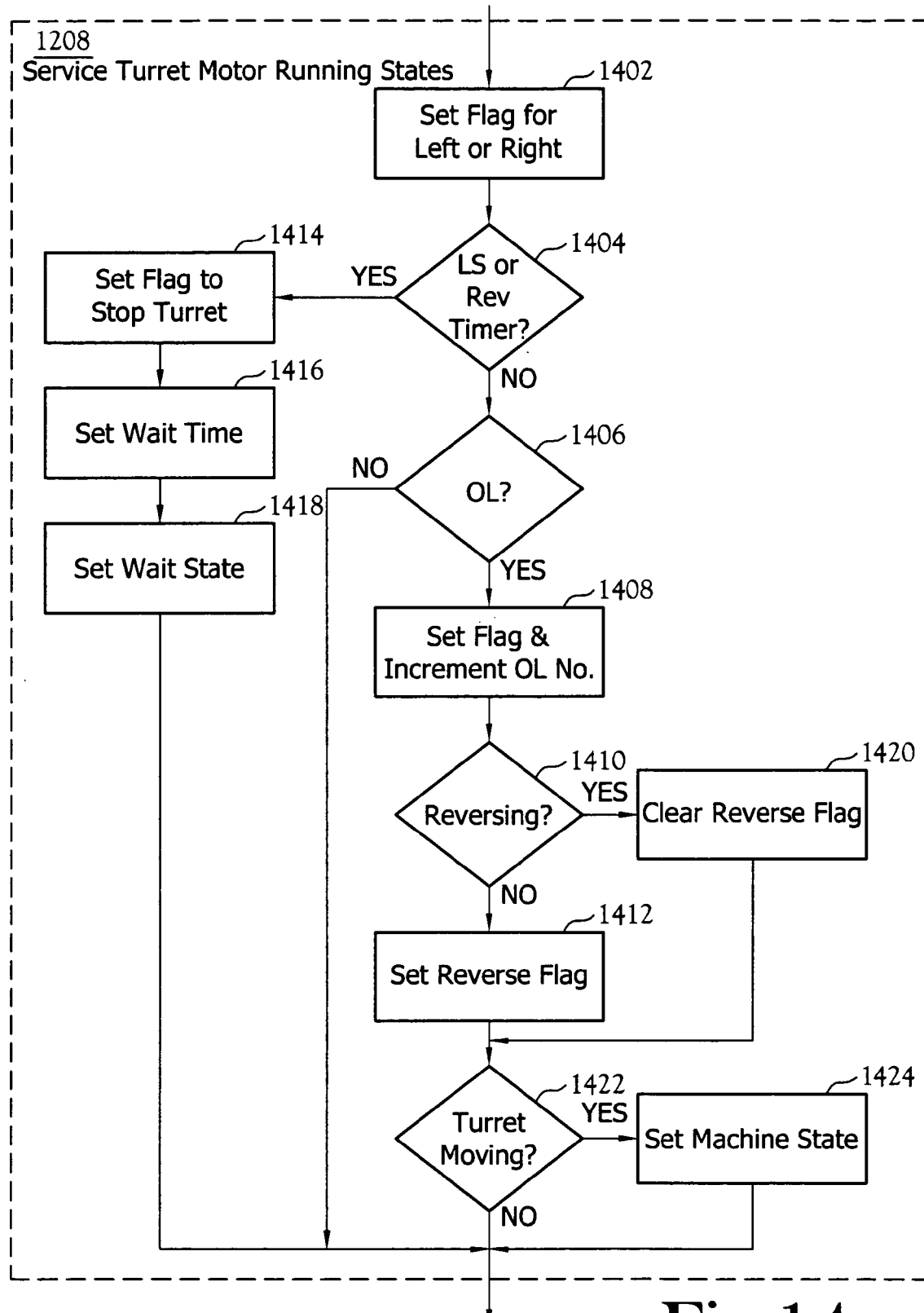
FIG. 14 is a flow diagram of one embodiment of the method for servicing the turret motor running states.

FIG. 12 illustrates a flow diagram of one embodiment of the method for testing whether a motor is running and servicing the motor running states 508. The step of testing whether either of the motors 204, 206 is running is performed by checking each motor individually 1202, 1206 and then servicing the running motor 1204, 1208, respectively. In one embodiment, the rake motor 204 is tested 1202 and then the turret motor is tested 1206. In another embodiment, the order of testing the motors 1202, 1206 is reversed. FIG. 13 illustrates a flow diagram of one embodiment of the method for servicing the rake motor running states 1204. FIG. 14 illustrates a flow diagram of one embodiment of the method for servicing the turret motor running states 1208.

FIG. 13 illustrates a flow diagram of one embodiment of the method for servicing the rake motor running states 1204. The first step is to set a flag to move the rake 202 up or down 1302. The limit switches 412 and motor reverse timer are checked 1304. If either a limit switch 412 is actuated or the motor reverse timer equals zero, then the flag to stop the rake is set 1314, the WAIT time is set 1316, the WAIT state is set 1318, and the routine 1204 is exited. In one embodiment, the WAIT time is set to 1 second. If none of the rake limit switches 412 are actuated and the motor reverse timer has not timed out, then the rake motor overload sensor 414 is checked 1306. If there is no overload 1306, then the routine 1204 is exited. If there is an overload 1306, then the flag to stop the rake is set and the overload counter is incremented 1308. If the rake 202 was reversing 1310, then the reverse flag is cleared 1320, otherwise, the reverse flag is set 1312. The position and direction of the rake 202 is then checked 1322 relative to mid, which is the position of the rake 202 in which the rake tines are horizontal and any litter collected by the rake 202 is supported by the rake 202.

The rake 202 has three positions: down, up, and mid. In the down position, the rake 202 engages the litter. In the up position, the rake 202 is rotated approximately 180 degrees from the down position. The mid position of the rake 202 is with the rake 202 horizontal and this position is used to carry the waste collected from the litter to the waste bin 214. Accordingly, there are four movements relative to the mid position: mid to up, up to mid, mid to down, and down to mid. Each of these movements defines a machine state which is set 1324 if the rake is moving relative to the mid position 1322. If the rake 202 is not moving relative to the mid position or after the machine state is set 1324, the routine for servicing the rake motor running states 1204 is exited.

FIG. 14 illustrates a flow diagram of one embodiment of the method for servicing the turret motor running states 1208. The first step is to set a flag to move the turret 212 left or right 1402. The limit switches 412 and motor reverse timer are then checked 1404. If either a limit switch 412 is actuated or the motor reverse timer equals zero, then the flag to stop the turret 212 is set 1414, the WAIT time is set 1416, the WAIT state is set 1418, and the routine 1204 is exited. In one embodiment, the WAIT time is set to 1 second. If none of the turret limit switches 412 are actuated and the motor reverse timer has not timed out, then the turret motor overload sensor 414 is checked 1406. If there is no overload 1406, then the routine 1208 is exited. If there is an overload 1406, then the flag to stop the turret 212 is set and the overload counter is incremented 1408. If the turret 212 was reversing 1410, then the reverse flag is cleared 1420, otherwise, the reverse flag is set 1412. The position and direction of the turret 212 is then checked 1422.

The turret 212 has two directions: forward and reverse. In the forward direction the turret 212 is moving away from the home position. In the reverse direction turret 212 is moving toward the home position. Each of these directions defines a machine state which is set 1424. If the turret 212 is not moving or after the machine state is set 1424, the routine for servicing the turret motor running states 1208 is exited.

FIG. 15 illustrates a flow diagram of one embodiment of the method for checking the overloads, the litter, and the timers 516. The overload counter is checked 1502. In one embodiment, if the overload counter is greater than 3, then this step 1502 returns yes. If the overload counter is greater than a specified value 1502, then the machine sequence is changed to go home 1512, the machine state is set to move the rake down 1514, and the faulty litter flag is set 1516. After the settings are made 1512, 1514, 1516 or if the overload counter is less than the specified value 1502, the faulty litter flag is checked 1504. If faulty litter is detected 1504, the beep timer is checked 1508 to determine if it is time to warn the operator. If it is time to beep 1508, the beep timer is set and the beep is tone is generated 1510. In one embodiment, the beep timer is set to 8 seconds. In another embodiment, the beep tone is generated for 40 milliseconds.

Figure 23:
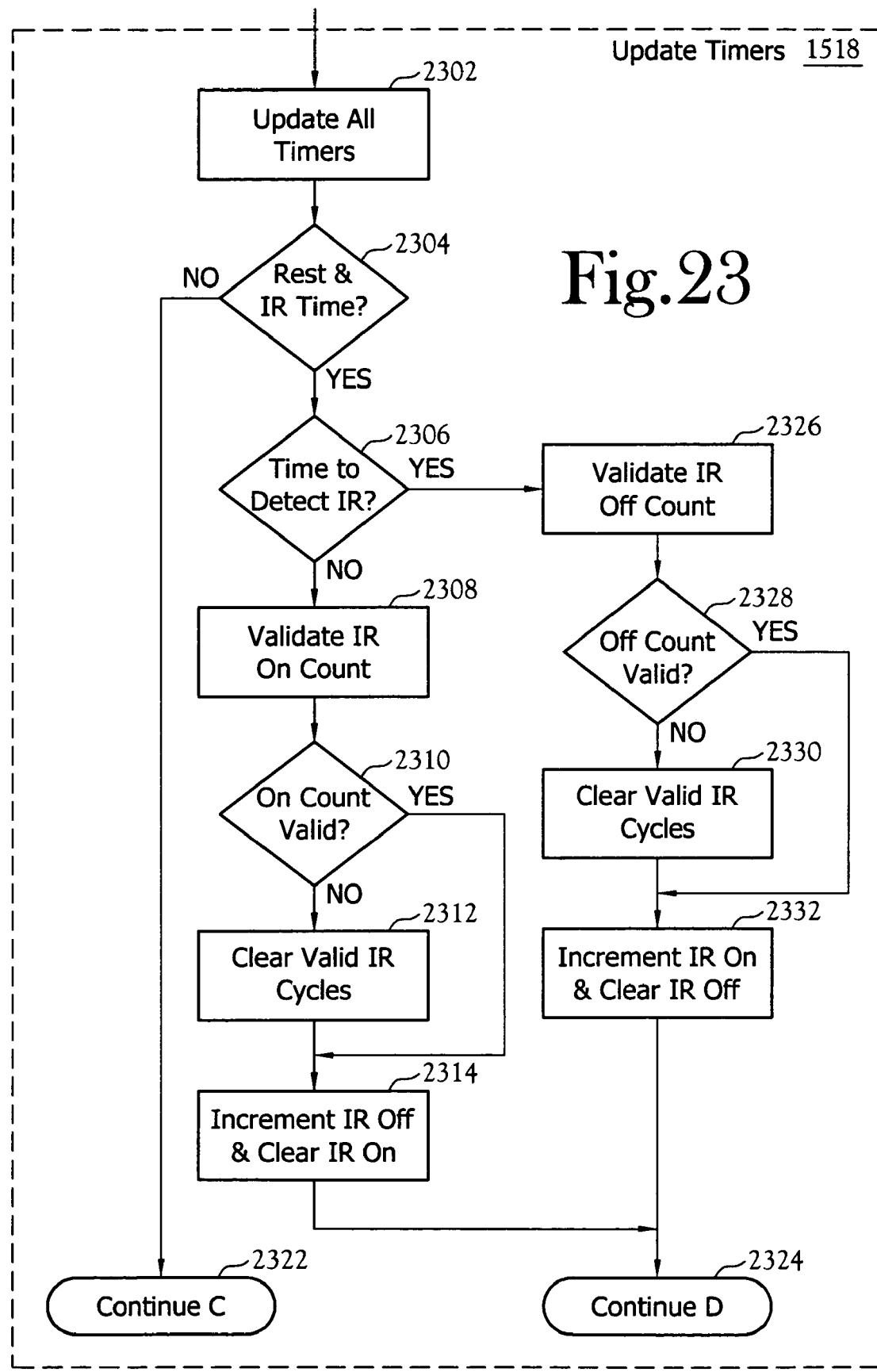
FIG. 23 is a partial flow diagram of one embodiment of the method for updating the timers.
Figure 24:
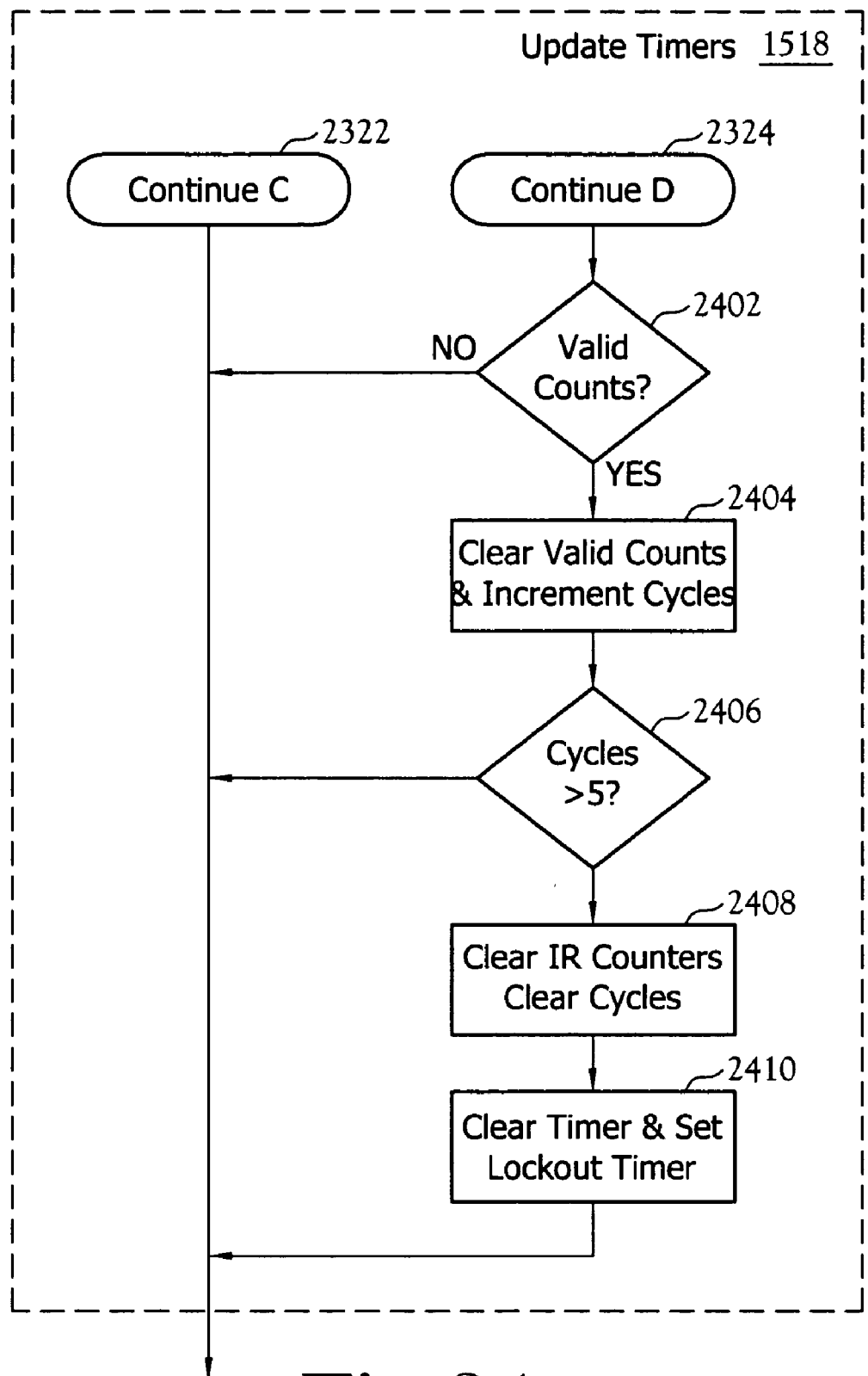
FIG. 24 is a partial flow diagram of one embodiment of the method for updating the timers.

The next step is whether it is time to update the timers 1506. If so, then the timers are updated 1518. If not, the routine 516 exits. FIG. 23 and 24 illustrate a partial flow diagram of one embodiment of the method for updating the timers 1518.

Figure 16:
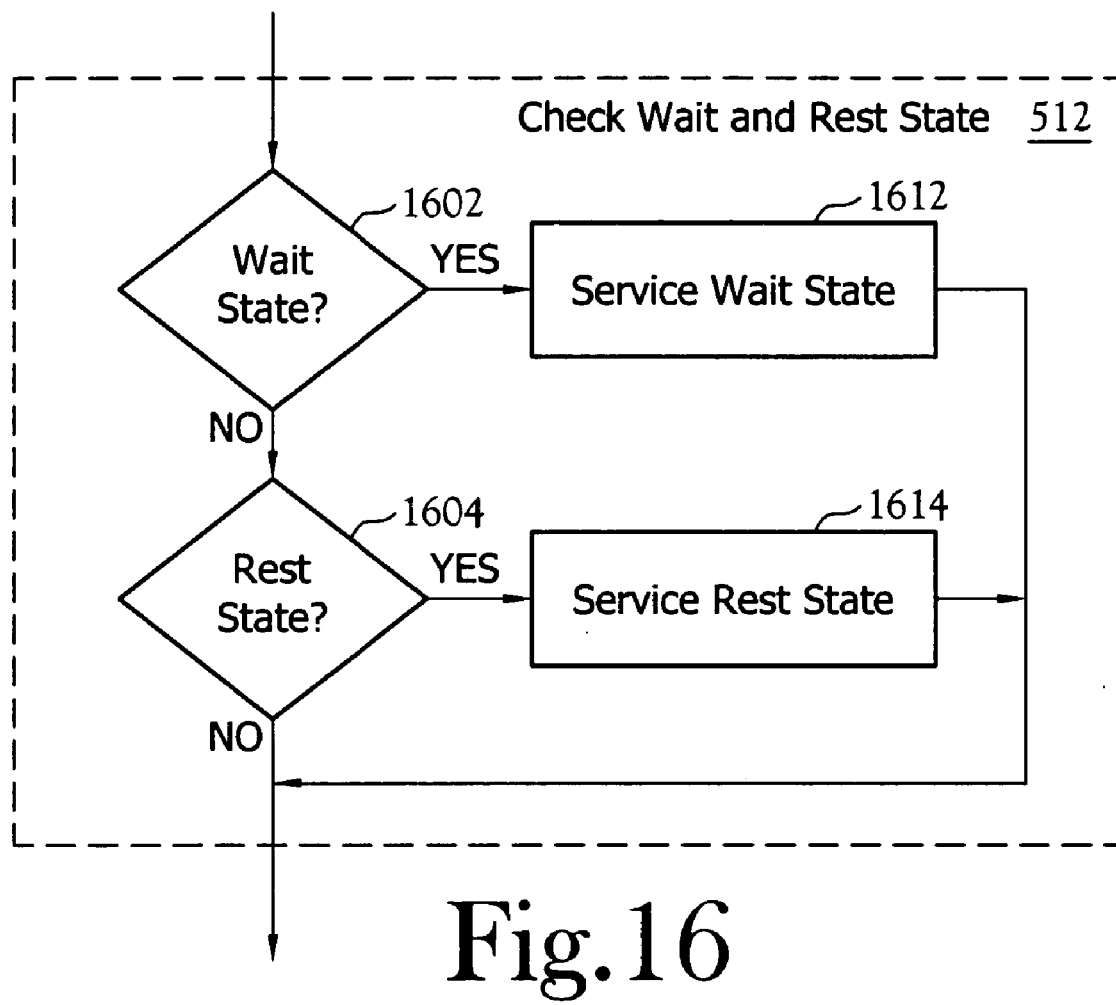
FIG. 16 is a flow diagram of one embodiment of the method for shaking the rake.
Figure 18:
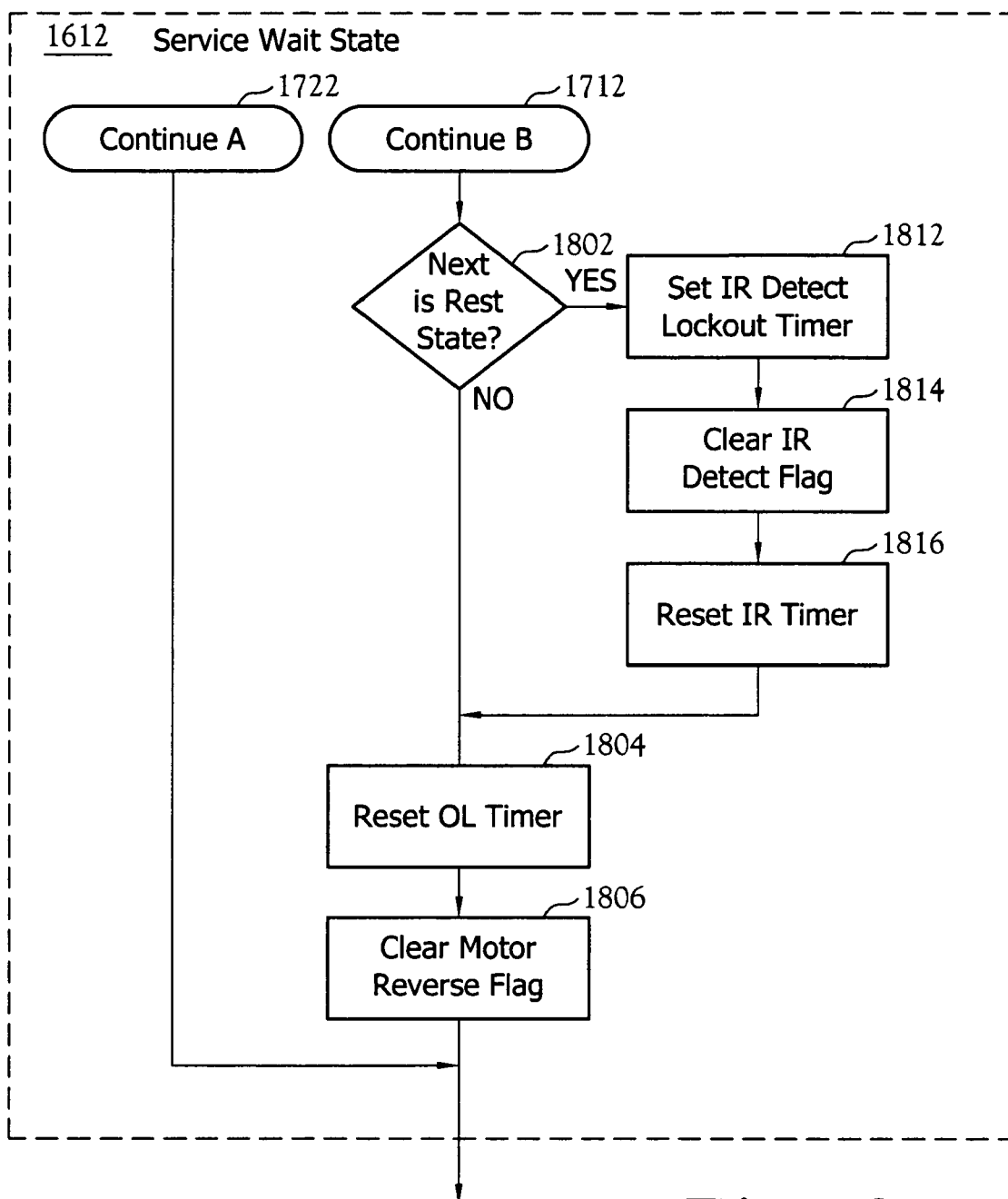
FIG. 18a is a partial flow diagram of one embodiment of the method for servicing the WAIT state.
FIG. 18b is a partial flow diagram of one embodiment of the method for servicing the WAIT state.
Figure 19:
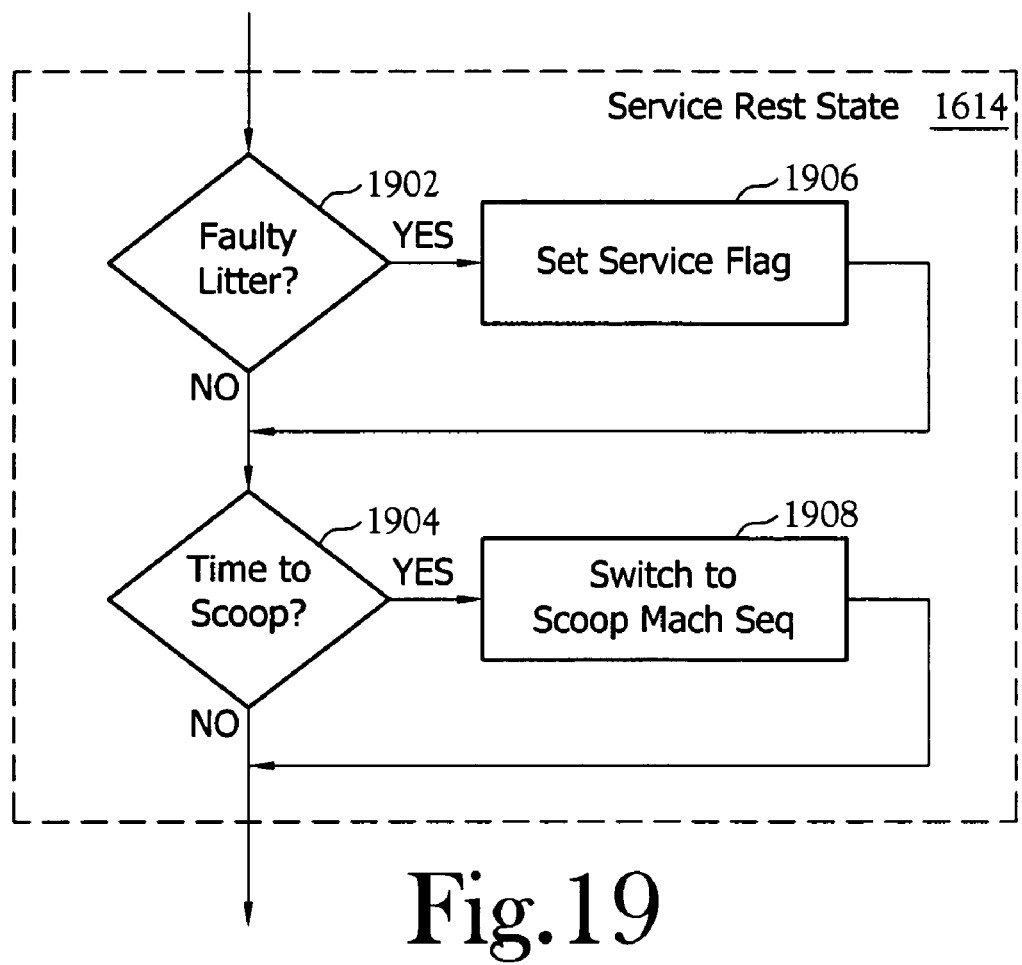
FIG. 19 is a flow diagram of one embodiment of the method for servicing the REST state.

FIG. 16 illustrates a flow diagram of one embodiment of the method for checking the WAIT and REST state 512. The litter box 10 has a WAIT state and a REST state. In one embodiment, this routine 512 checks for the presence of the WAIT state 1602 and then checks for the presence of the REST state 1604. In another embodiment, the order of checking is reversed. If the WAIT state is detected 1602, then the WAIT state is serviced 1612. FIGS. 17 and 18 illustrate a partial flow diagram of one embodiment of the method for servicing the WAIT state 1612. If the REST state is detected 1604, then the REST state is serviced 1614. FIG. 19 illustrates a flow diagram of one embodiment of the method for servicing the REST state 1614.

FIGS. 17 and 18 illustrate a flow diagram of one embodiment of the method for servicing the WAIT state 1612. The first step is to check the WAIT timer 1702. If the WAIT timer has not timed out 1702, the routine for servicing the WAIT state 1612 exits. If the WAIT timer has timed out 1702, the reverse flag is checked 1704 to determine if the motor was reversing. If the motor was not reversing 1704, then the next machine state is set 1714 and the fault counter is cleared 1716. After the fault counter is cleared 1716 or if the motor was reversing 1704, the litter is checked for being faulty 1706. In one embodiment, the litter is determined to be faulty if there are more than three motor overload conditions detected. If faulty litter is detected 1706, the machine state is switched to the go home machine sequences and the routine jumps to the step that checks whether the next state is the REST state 1802. If the litter is not faulty 1706, the power up state is checked 1708. If the power up state is true 1708, then the machine state is switched to the start up machine sequences and the routine jumps to the step that checks whether the next state is the REST state 1802. If the power up state is not true 1708, then the machine state is switched to the scoop machine sequences 1710.

The next step is to check whether the next state is the REST state 1802. If the next state is the REST state 1802, the IR detect lockout timer is set 1812, the IR detect flag is cleared 1814, and the IR timer is reset 1816. In one embodiment, the IR detect lockout timer is set 1812 to one second. In one embodiment, the IR timer is set 1816 to fifteen minutes.

The next step is to reset the overload timer 1804. In one embodiment, the overload timer is reset 1802 to 100 milliseconds. The last step is to clear the motor reverse flag 1806. The routine for servicing the WAIT state 1612 then exits.

In one embodiment, the faulty litter check 1606 includes keeping track of the number of motor overloads detected. When a specified number of motor overloads are detected, then the litter is considered faulty. In one embodiment, if the motors are overloaded more than three times during one scoop cycle, then the litter is considered faulty. Various factors contribute to faulty litter.

For example, too large clumps can bog down the turret motor 206 causing the overload sensor 414 to detect excessive motor current as the rake 202 attempts to move the large clump through the litter.

FIG. 19 illustrates a flow diagram of one embodiment of the method for servicing the REST state 1614. In one embodiment, the first step is to determine if the litter is faulty 1902 and the second step is to determine if it is time to scoop 1904. In another embodiment, the order of the two steps 1902, 1904 are reversed. If faulty litter is determined 1902, the litter service flag is set 1906. The litter service flag is used to sound the litter alarm 418. If it is time to scoop 1904, the machine sequence is switched to scoop. In one embodiment, the time to scoop 1904 is determined by the IR detect flag being set and the IR timer having counted down to zero. In another embodiment, the time to scoop 1904 is determined by the IR timer having counted down to zero.

Figure 21:
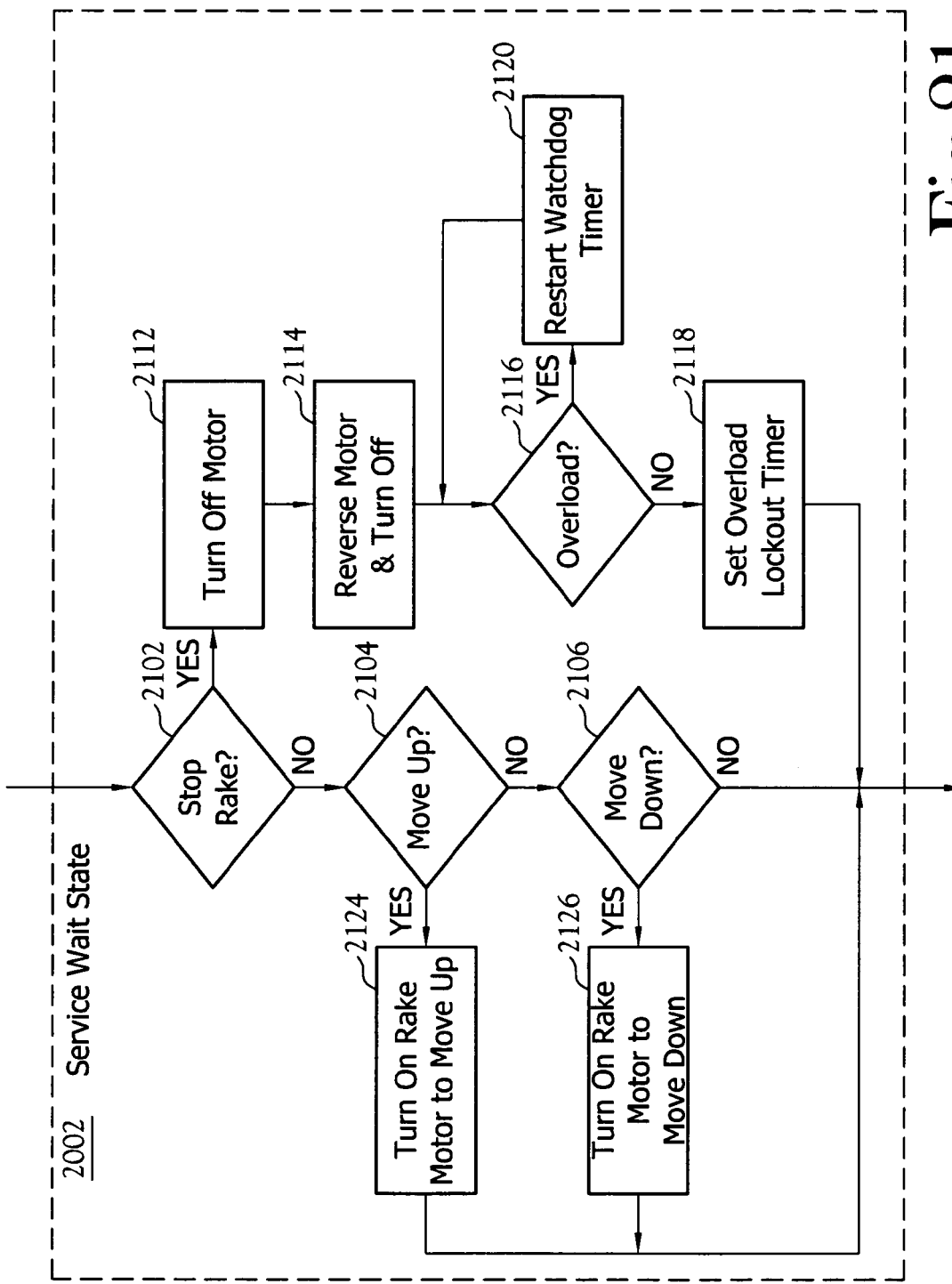
FIG. 21 is a flow diagram of one embodiment of the method for servicing the rake motor.
Figure 22:
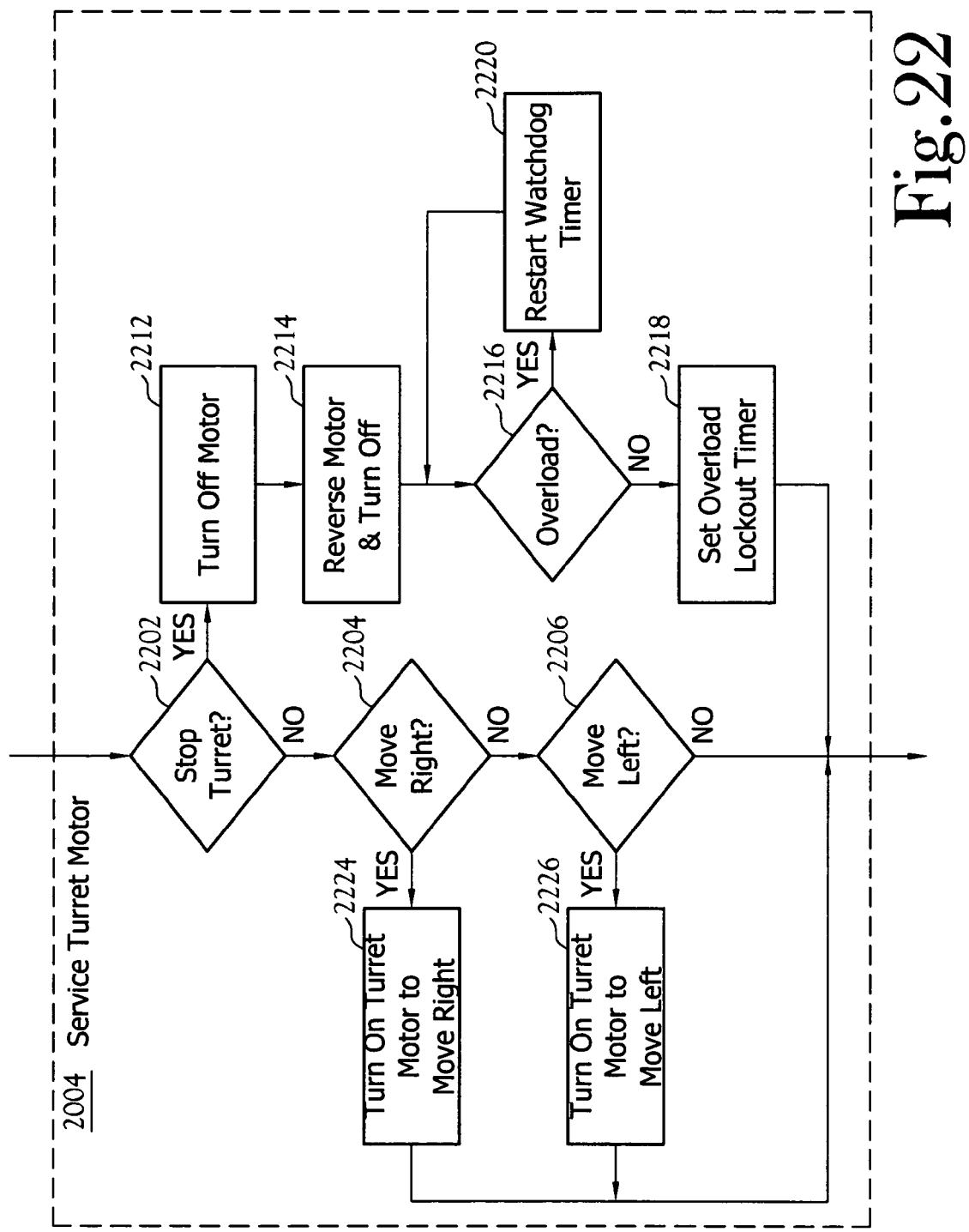
FIG. 22 is a flow diagram of one embodiment of the method for servicing the turret motor.

FIG. 20 illustrates a flow diagram of one embodiment of the method for servicing the motors 514. The rake motor is serviced 2002 and the turret motor is serviced 2004. FIG. 21 illustrates a flow diagram of one embodiment of the method for servicing the rake motor 2002. FIG. 22 illustrates a flow diagram of one embodiment of the method for servicing the turret motor 2004.

FIG. 21 illustrates a flow diagram of one embodiment of the method for servicing the rake motor 2002. The first step is to determine whether to stop the rake 2102. If the rake 202 is to be stopped 2102, the rake motor 204 is turned off 2112, the motor is reversed and turned off 2114, the overload sensor 414 is checked for an overload condition 2116, and the overload lockout timer is set 2118 if there is no overload condition 2116. If there is a motor overload 2116, the watchdog timer is restarted 2120 and the overload is checked 2116 again. In one embodiment, the motor is reversed and turned off 2114 by first reversing the rake motor 204 for 50 milliseconds and then turning off the motor 204.

If the rake 202 is not to be stopped 2102, then the direction the rake 202 is to be moved is evaluated 2104, 2106. If the rake is to be moved up 2104, then the rake motor 204 is turned on to move the rake 202 up 2124. If the rake is to be moved down 2106, then the rake motor 204 is turned on to move the rake down 2126.

FIG. 22 illustrates a flow diagram of one embodiment of the method for servicing the turret motor 2004. The first step is to determine whether to stop the turret 2202. If the turret 212 is to be stopped 2202, the turret motor 206 is turned off 2212, the motor is reversed and turned off 2214, the overload sensor 414 is checked for an overload condition 2216, and the overload lockout timer is set 2218 if there is no overload condition 2216. If there is a motor overload 2216, the watchdog timer is restarted 2220 and the overload is checked 2216 again. In one embodiment, the motor is reversed and turned off 2214 by first reversing the turret motor 206 for 50 milliseconds and then turning off the motor 206.

If the turret 212 is not to be stopped 2202, then the direction the turret 212 is to be moved is evaluated 2204, 2206. If the turret 212 is to be moved right 2204, then the turret motor 206 is turned on to move the turret right 2224. If the turret 212 is to be moved left 2206, then the turret motor 206 is turned on to move the turret 212 left 2226.

FIGS. 24a and 24b illustrate a flow diagram of one embodiment of the method for updating the timers 1518. The first step is to update all the timers 2302. The next step is to determine whether it is time to detect an IR event 2304. In one embodiment, it is time to detect an IR event 2304 if the state is REST and it is time to detect an IR signal from the IR sensor 416. If it is not time to detect an IR event 2304, then the update timers routine 2318 exits.

If it is time to detect an IR event 2304, then the IR detect flag is checked 2306. If an IR event is detected 2306, then the IR Off counter is validated 2326 and then the validated IR Off counter value is checked 2328 for validity. If the Off count is not valid 2328, then the number of valid IR cycles is cleared 2330. The next step is to increment the IR On counter and clear the IR Off counter 2330. If an IR event is not detected 2306, then the IR On counter is validated 2308 and then the validated IR On counter value is checked 2310 for validity. If the On count is not valid 2310, then the number of valid IR cycles is cleared 2312. The next step is to increment the IR Off counter and clear the IR On counter 2314.

The next step is to determine whether the high and low counts are valid 2402. If not, the update timers routine 1518 exits. If they are valid 2402, then the valid Off and On counts are cleared and the number of valid whole cycles are incremented 2404. The next step is to determine if the number of valid cycles is greater than a specified number 2406. In the illustrated embodiment, the specified number is ten. If the number of valid cycles is not greater than a specified number 2406, then the update timers routine 1518 exits. If the number of valid cycles is greater than a specified number 2406, then the IR Off and On counters are cleared and the number of valid whole cycles are cleared 2408 and the IR timer is cleared and the IR detected flag is set 2410. The update timers routine 1518 then exits.

FIG. 25 illustrates a table of flags used in one embodiment of the software. The figure lists the flags in one column and a short description of each flag in the second column. The flag names are preceded with an "f" to denote that the variable name is a flag. The state of each flag is controlled by the software as described previously. Those skilled in the art will recognize that other flags can be used without departing from the spirit and scope of the present invention.

FIG. 26 illustrates a table of timers and counters used in one embodiment of the software. The figure lists the timer and counter names in the first column and a short description of each in the second column. The state of each timer and counter is controlled by the software as described previously. Those skilled in the art will recognize that other timers and counters can be used without departing from the spirit and scope of the present invention.

FIG. 27 illustrates a block diagram showing one embodiment of the machine states. The machine states form a loop and are stored sequentially. The rake moving state 2702 has four discreet states based on the three positions of the rake 202 (rest, or down, mid, and up positions): the rake 202 moving from the down to the mid position 2712, the rake 202 moving from the mid to the up position 2714, the rake 202 moving from the mid to the down position 2716, and the rake 202 moving from the up to the mid position 2718. The next state is the turret moving state 2704, which has four discreet states based on the three positions of the turret 212 (rest, or dump, mid, and scoop positions): the turret 212 moving from rest to scoop position 2722, the turret 212 moving through the pickup to the dump position 2724, the turret 212 moving through the pickup to the mid position 2726, and the turret 212 moving through the mid to the dump position 2728. The next state is the WAIT state 2706, followed by the REST state 2708.

FIG. 28 illustrates a block diagram showing one embodiment of the steps for the scoop sequence. The scoop sequence moves the rake 202 through the litter to collect the animal waste and deposit the waste in the waste bin 218. The first step in the sequence is to move the turret to scoop 2802, which requires moving the turret 212, with the rake 202 in the down position, from the rest position next to the waste bin 218 to the scoop position at the opposite side of the base 102. The next step is to move the rake 202 to the mid position 2804 to pick up the waste that has been raked as the rake 202 moved through the litter. With the rake 202 in the mid position, the waste is supported by the rake 202.

The next step is to move the turret 212 to the dump position 2806. In this step 2806, the rake 202 is maintained in the mid position and carries the waste to the waste bin 218 as the turret 212 rotates in reverse. After the turret 212 is at the dump position, the next step is to move the rake 202 up to dump 2808 so that the waste carried by the rake 202 is dumped into the waste bin 218.

The next step is to move the rake 202 to mid position 2810 and then to move the turret 212 to the scoop position 2812. The rake 202 is kept in the mid position as the turret 212 moves to the scoop position 2812. After the turret 212 returns to the scoop position, the next step is to move the rake 202 down 2814 such that the rake 202 is in the down position. The next step is to move the turret 212 to sweep 2816. This step 2816 moves the rake 202 back through the litter. In one embodiment, this step 2816 smoothes and redistributes the litter.

The next step is to move the rake 202 up 2818 in the middle of the return sweep to avoid pile ups. As the rake 202 moves back through the litter, any waste not picked up on the forward pass may be collected in the reverse pass. Because the rake 202 does not pick up or scoop the waste on the reverse pass, the rake 202 is lifted before reaching the turret's rest position. Any waste collected during the reverse pass is left at the mid position of the turret 212.

The next step is to continue to move the turret 212 to the rest position 2820 and then to move the rake 202 down 2822. The final step is to rest and wait 2824 for the animal to use the litter box the animal to use the litter box 10 again, at which time the scoop sequence repeats.

FIG. 29 illustrates a block diagram showing one embodiment of the steps for the start up sequence. The start up sequence initially moves the rake 202 to the down position 2902 to ensure that the rake is in a known starting position, then the start up sequence follows the same sequence as the scoop sequence as described above. In the illustrated embodiment, the rake 202 position is known before the scoop sequence begins because the start up sequence leaves the rake 202 in the down position 2924.

The first step of the start up sequence is to move the rake 202 down 2902. The next step is to move the turret 212 to scoop 2904. The next step is to move the rake 202 to mid position to pick up 2906. The next step is to move the turret 212 to the dump position 2908. The next step is to move the rake 202 up to dump 2910. The next step is to move the rake 202 to mid position 2912. The next step is to move the turret 212 to the scoop position 2914. The next step is to move the rake 202 down 2916. The next step is to move the turret 212 to sweep 2918. The next step is to move the rake 202 up in the middle of the sweep to avoid pile ups 2920. The next step is to move the turret 212 to the rest position 2922. The next step is to move the rake 202 down 2924. The final step is to rest and wait 2926 for the animal to use the litter box the animal to use the litter box 10 again, at which time the scoop sequence repeats.

FIG. 30 illustrates a block diagram showing one embodiment of the steps for the go home sequence. The go home sequence positions the rake 202 and the turret 212 at a known starting position with the rake 202 down and the turret 212 at the rest, or dump, position.

The first step of the go home sequence is to move the rake 202 down 3002. The next step is to move the rake 202 to mid position 3004. The next step is to move the turret 212 to the dump position 3006. The next step is to move the rake 202 down 3008. The final step is to rest and wait 3010 for the animal to use the litter box the animal to use the litter box 10 again, at which time the scoop sequence repeats.

Figure 31:
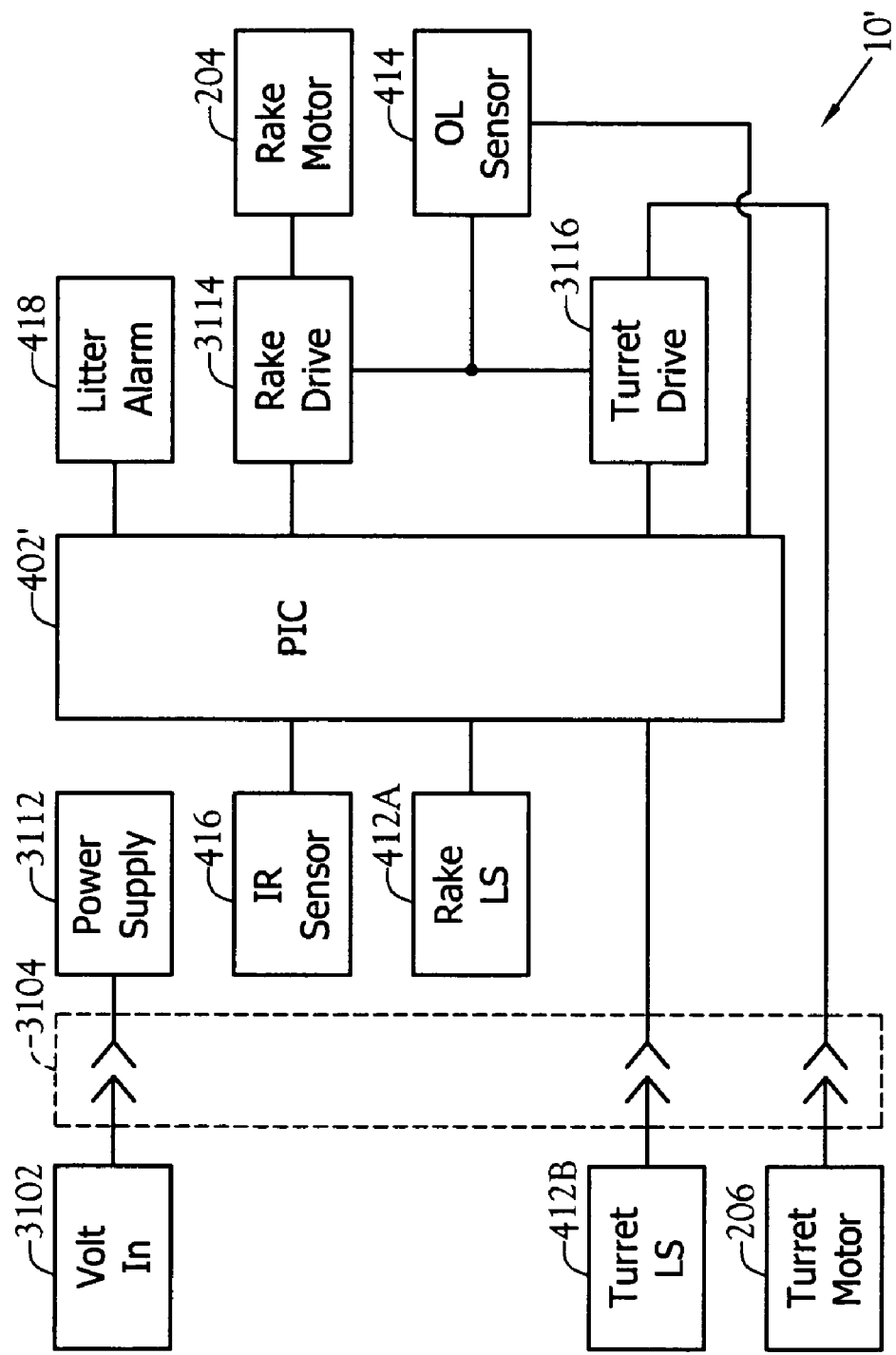
FIG. 31 is a block diagram of another embodiment of the self-cleaning litter box.

FIG. 31 illustrates a block diagram of another embodiment of the self-cleaning litter box 10'. A connector 3104 provides connections between the components mounted to the base 102 and the components that move with the turret 212. The components that are stationary include the voltage in 3102 that provides power to the power supply 3112, which rotates with the turret 212. Also, the turret limit switches 412B and the turret motor 206 are located outside the rotating portion of the turret 212. Rotating with the turret 212 is a controller 402' connected to the rake and turret drives 3114, 3116, the overload sensor 414, and the IR sensor 416. Those skilled in the art will recognize that the power supply 3112 provides power to the various components and circuits of the litter box 10' and that the connections are not necessary to be shown to understand the functioning of the block diagram. In one embodiment, the controller 402' is a programmable integrated circuit (PIC), which is a microcontroller having a processor 404, a memory 406 and input/output 408. In one embodiment, the controller 402' is a Microchip Model PIC 16F627.

The rake drive 3114 and the turret drive 3116 are driver circuits that each receive a logical signal from the controller 402' and convert that logical signal into a power signal sufficient to drive the rake motor 204 and the turret motor 206, respectively. In one embodiment, the overload sensor 414 monitors the current passing through the rake motor 204 and the turret motor 206 and determines whether that current exceeds an allowable amount, thereby indicating that the motor 204, 206 is being overloaded. In one embodiment, the overload sensor 414 monitors a common leg of the power connections to the motors 204, 206.

Those skilled in the art will recognize that the location of the various components of the litter box 10' can vary without departing from the scope and spirit of the present invention. For example, in various embodiments, one or more of the controller 402', the drives 3114, 3116, the overload sensor 414, the IR sensor 416, and the power supply 3112 are located outside the rotating portion of the turret 212. In another embodiment, the stationary components and the components located in the rotating portion of the turret 212 are connected with a flexible cable. In this embodiment, the connector 3104 is not used.

Figure 32:
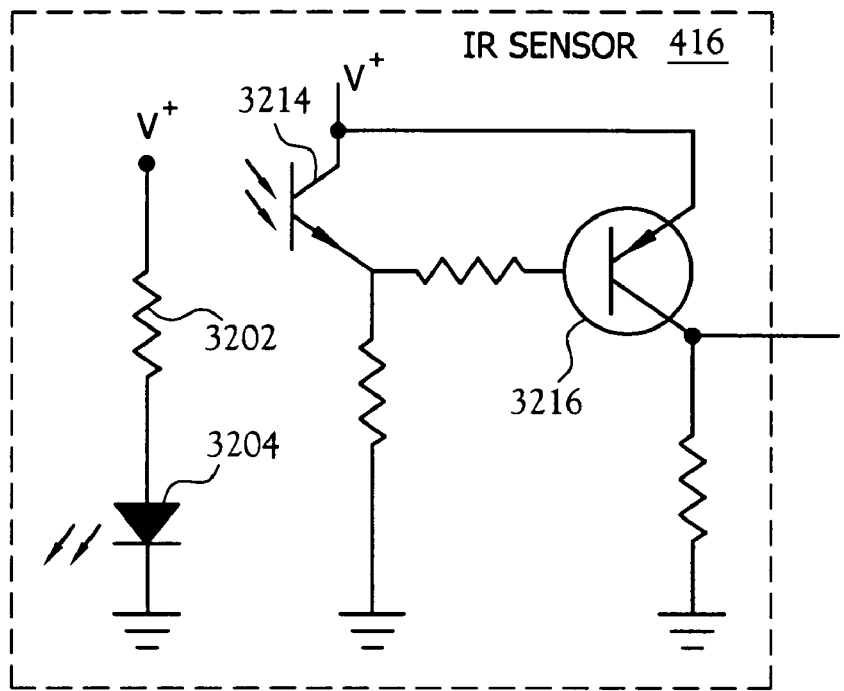
FIG. 32 is a schematic of one embodiment of an infrared sensor.

FIG. 32 illustrates a schematic of one embodiment of an infrared sensor 416. The illustrated embodiment of the IR sensor 416 includes two circuits: a transmitter circuit and a receiver circuit. The transmitter circuit includes an IR LED 3204 with a dropping resistor 3202. The LED 3204 continuously emits a beam directed toward a reflector. In one embodiment, the LED 3204 emits an infrared beam. In other embodiments, the LED 3204 emits a beam having other wavelengths of emitted light. The receiver circuit includes a light sensor 3214 that is sensitive to the wavelength of the light emitted by the LED 3204. The output of the light sensor 3214 is amplified by the transistor 3216, which provides an output signal connected to the controller 402, 402'. In one embodiment, the LED 3204 and the light sensor 3214 are mounted adjacent to each other with a light barrier separating them such that the light sensor 3214 only receives the reflected light beam from the LED 3204.

Figure 33:
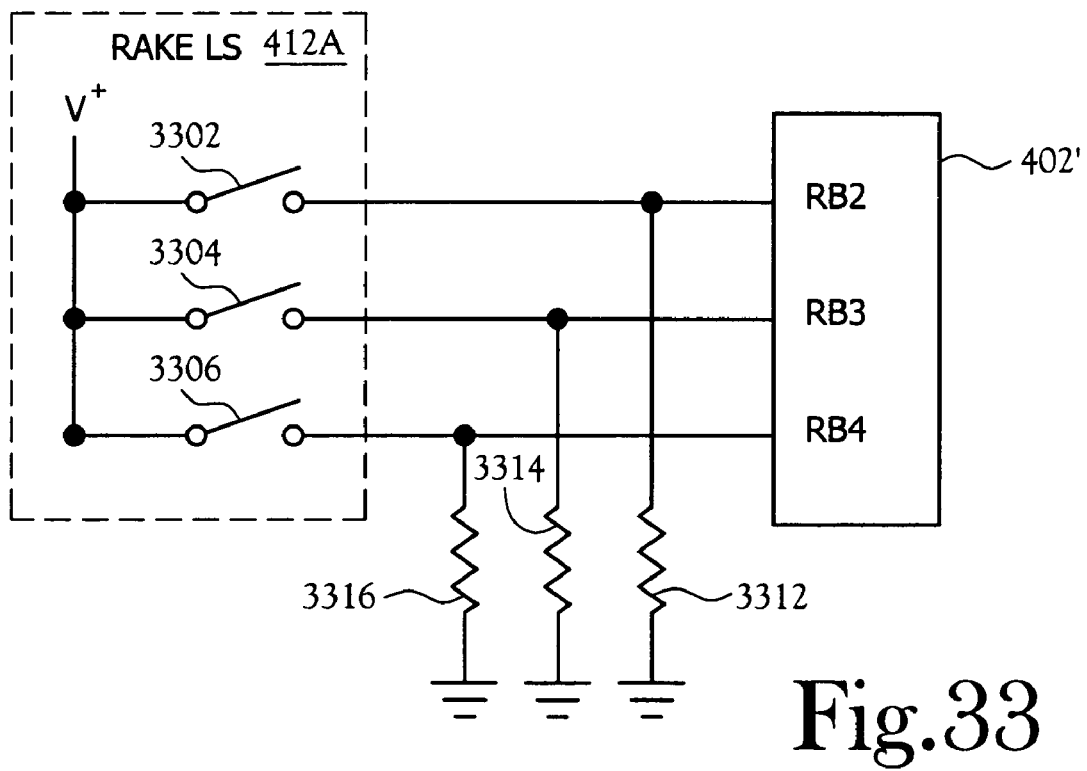
FIG. 33 is a schematic of one embodiment of the rake limit switches.

FIG. 33 illustrates a schematic of one embodiment of the rake limit switches 412A. The rake 202, in the illustrated embodiment, has three switches 3302, 3304, 3306, one for each of the three positions: up, mid, and down. Each switch 3302, 3304, 3306 is connected to a pull down resistor 3312, 3314, 3316, respectively, and is connected to an input RB2, RB3, RB4 on the controller 402'. In one embodiment, the controller 402' is a Microchip Model PIC 16F627 and the inputs RB2, RB3, RB4 are bidirectional I/O ports programmable with a weak pull-up. The turret limit switches 412B have a similar configuration and are wired to other inputs on the controller 402'.

Figure 34:
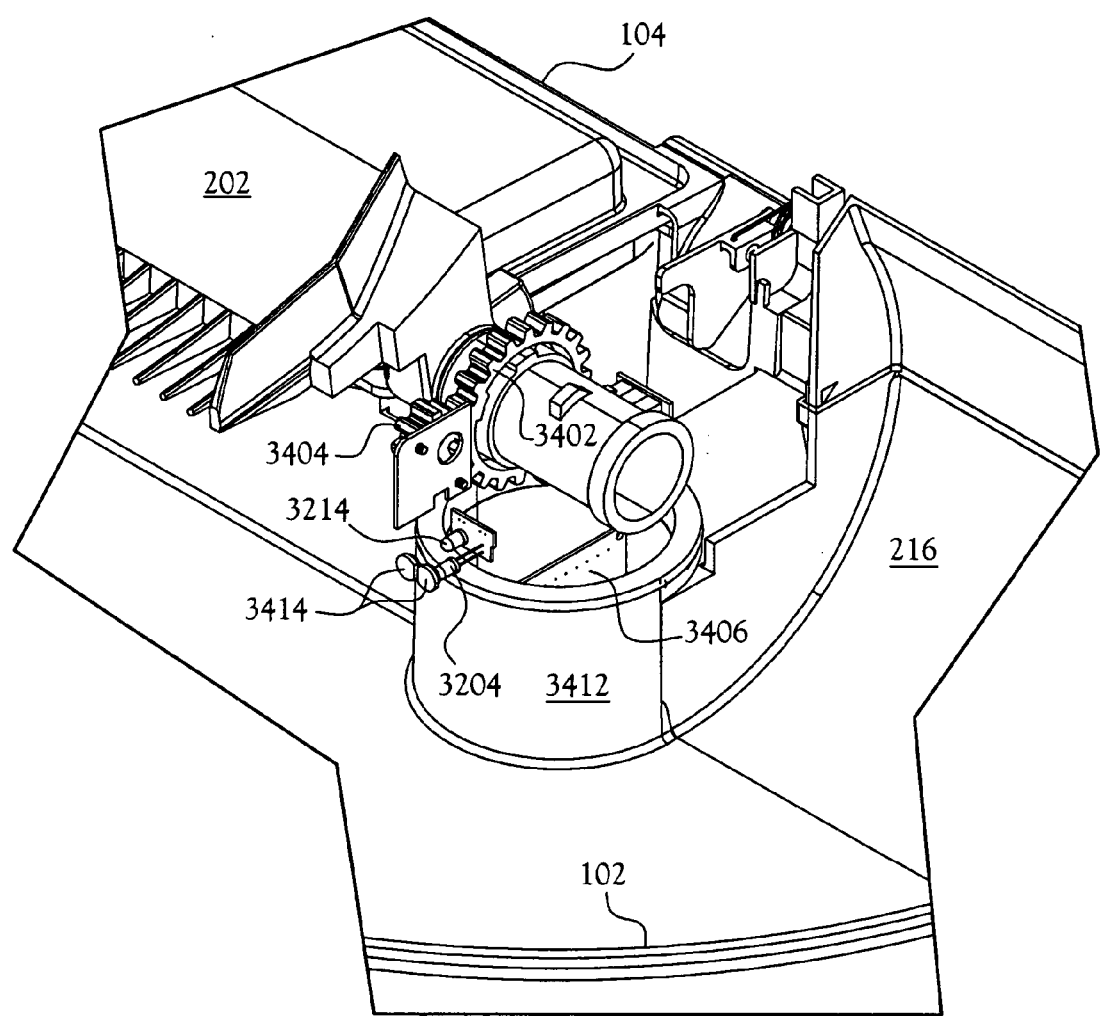
FIG. 34 is a partial perspective view of the rake mechanism with the turret cover not shown.

FIG. 34 illustrates a partial perspective view of the rake mechanism with the turret cover not shown. The rake 202 has a drive gear 3402 at the inboard end. The drive gear 3402 is driven by a spur gear 3404 connected to the rake motor 204 (not shown in this figure).

Below the inboard end of the rake 202 is the turret support 3412, upon which sits the turret cover (not illustrated in this figure). Above the turret support 3412 are the IR LED 3204 and the light sensor 3214, with their corresponding lenses 3414. Inside the turret support 3412 is a circuit board 3406 oriented vertically. The circuit board 3406, in one embodiment, includes the controller 402 and other components to support operation of the litter box 10.

FIG. 34 also illustrates the scoop region 216, which is bounded by a curved surface forming the back wall of the base 102. The curved surface of the scoop region 216 allows the rake 202 to rotate from the down position to the mid position without the collected waste dropping off the rake 202.

Figure 35:
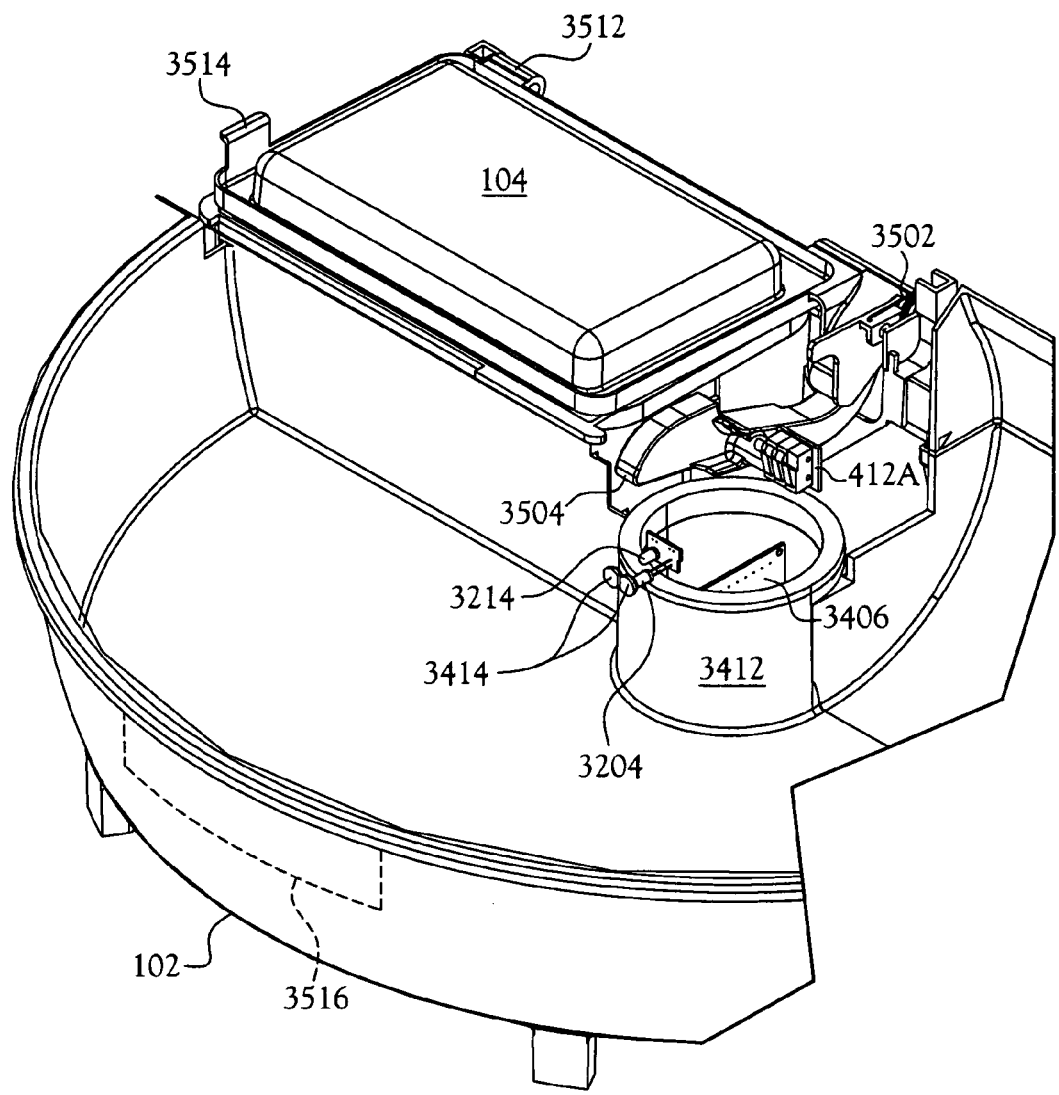
FIG. 35 is a partial perspective view of the waste bin cover showing the rake limit switches.

FIG. 35 illustrates a partial perspective view of the waste bin cover 104 showing the rake limit switches 412A. The waste bin cover 104 is rotatably connected to the base 102. The outboard hinge 3512 is visible in FIG. 35. Opposite the hinged end, on the outboard corner, is a lifting handle 3514 for manually lifting the lid 104 for access to the waste bin 214, such as when the waste bin 214 needs to have the collected waste removed. The lid 104 has a spring 3502 that applies a spring force to keep the lid 104 in the closed position. In one embodiment, the waste bin lever 3504 serves to lock the lid 104 in the open position when manually opened and also to automatically open the lid 104 when the rake 202 moves into the dump position with the rake 202 in the mid position. In another embodiment, the waste bin lid 104 is secured in the open position by tilting the lid 104 back such that the weight of the lid 104 overcomes the closing force of the spring 3502.

Visible in FIG. 35 are the rake limit switches 412A. In the illustrated embodiment, the limit switches 412A are snap action microswitches with a lever actuator. Three switches 412A are illustrated, one each for the up position, mid position, and down position. The protrusions 3902, 3904 on the inboard end of the rake 202 are visible in FIG. 39. As the rake 202 rotates about its longitudinal axis 3704, the rake protrusions 3902, 3904 selectively actuate the appropriate limit switch 412A, so as to indicate to the controller 402 the position of the rake 202 about its longitudinal axis 3704.

A reflector 3516 is shown in phantom. The reflector 3516, in one embodiment, is a reflective material applied to the inside surface of the base 102 in such a position so as to reflect the light beam from the IR sensor 416 when the turret 212 is in the rest position.

Figure 36:
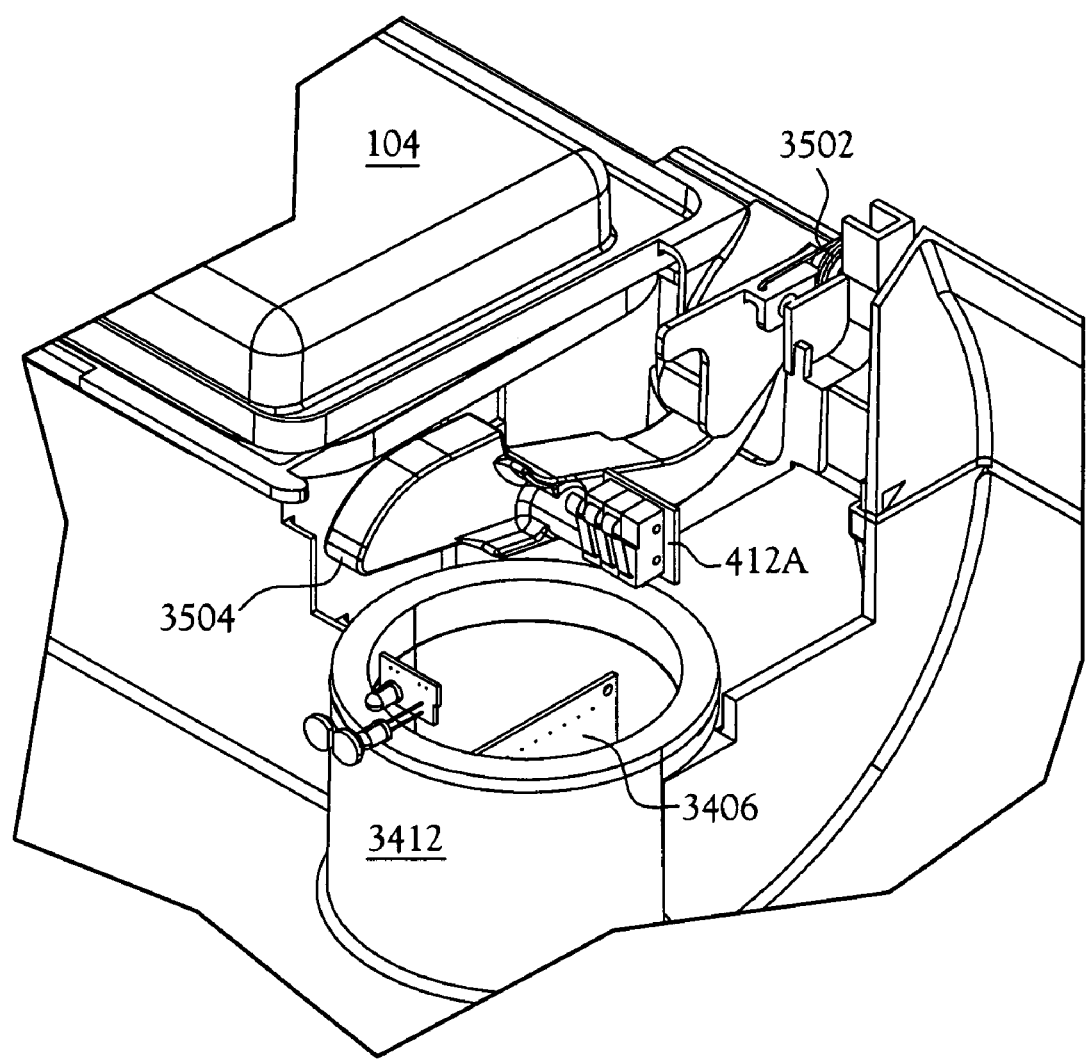
FIG. 36 is a partial perspective view of the waste bin cover opening mechanism with the turret cover and rake not shown.

FIG. 36 illustrates a partial perspective view of the waste bin cover opening mechanism with the turret cover and rake 202 not shown. On the inboard end of the waste bin lid 104 is a waste bin lever 3504 and a spring 3502. These members are illustrated in isolation in FIGS. 37 and 38.

Figure 37:
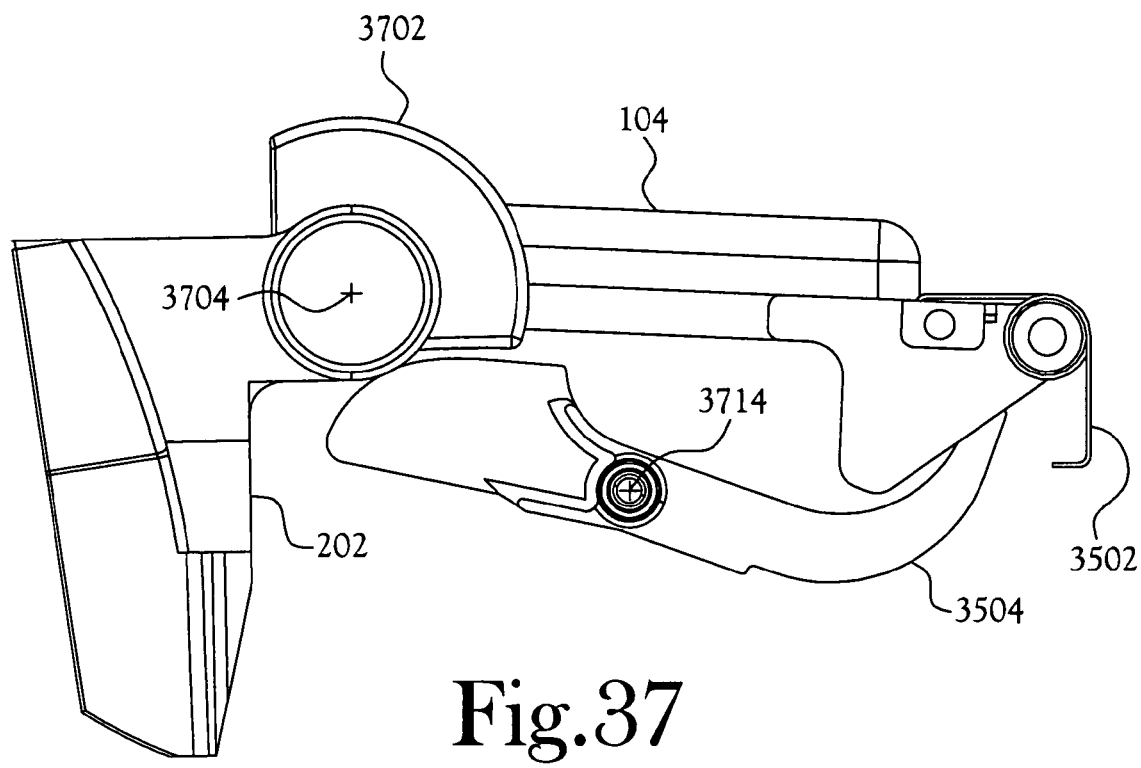
FIG. 37 is an inboard side view of the waste bin cover, rake, and waste bin lever.
Figure 38:
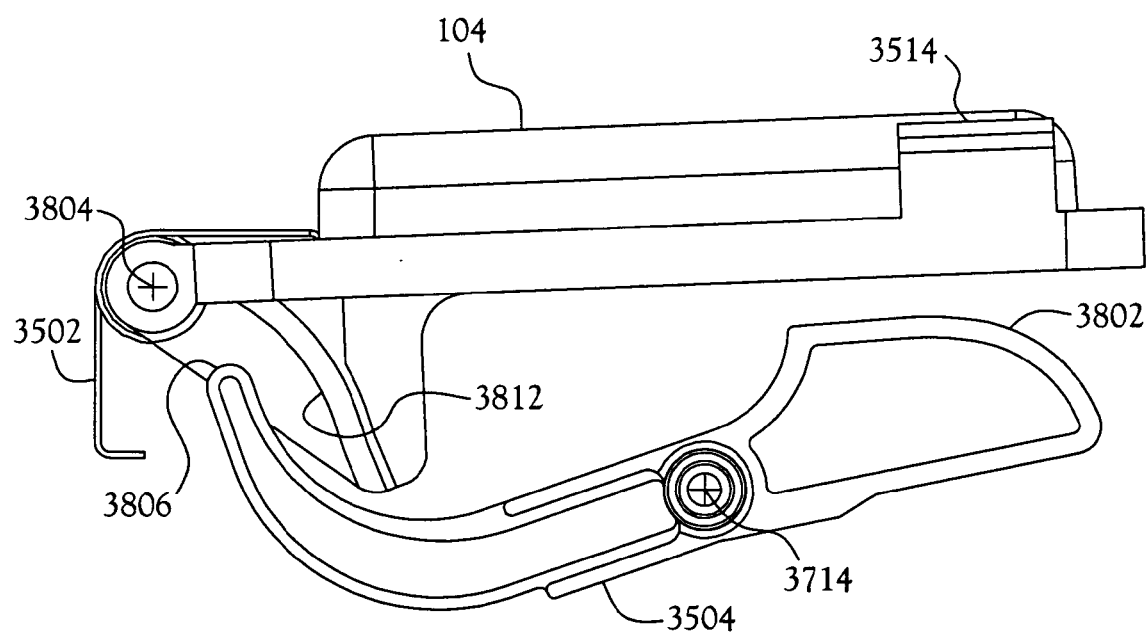
FIG. 38 is an outboard side view of the waste bin cover, rake, and waste bin lever.

FIG. 37 illustrates an inboard side view of the waste bin cover 104, the rake 202, and the waste bin lever 3504. FIG. 38 illustrates an outboard side view of the waste bin cover 104, the rake 202, and the waste bin lever 3504. The rake 202 is shown in FIG. 37 in the down position with the turret 212 in the dump, or rest, position. The rake 202 has a center of rotation 3704 about which the tines 306 rotate. The rake 202 also has a cam 3702 that interfaces with a cam end 3802 of the waste bin lever 3504.

The waste bin lever 3504 has a center of rotation, or pivot point, 3714 that passes through a pivot point supported by the base 102. The end 3806 opposite the cam end 3802 of the waste bin lever 3504 engages an actuate surface 3812 of the waste bin lid 104. As the waste bin lever 3504 rotates about the pivot point 3714, the end 3806 slides along the actuate surface 3812 of the waste bin lid 104, thereby forcing the lid 104 to pivot about the lid pivot point 3804 and to open.

In operation, the rake 202 is in the mid position with the rake cam 3702 positioned such that the outer surface of the rake cam 3702 engages the cam end 3802 of the waste bin lever 3504 when the turret 212 moves the rake 202 to the dump position. The rake cam 3702 engages and forces the cam end 3802 of the waste bin lever 3504 to pivot about the pivot point 3714, thereby forcing the end 3806 to engage the actuate surface 3812 of the waste bin lid 104. After the turret 212 moves fully to the dump position, the rake cam 3702 has forced the waste bin lever 3504 to fully open the waste bin lid 104, thereby allowing any collected waste to be dumped into the waste bin when the rake 202 is rotated to the up position. The rake cam 3702 is long enough such that when the rake is rotated between the mid and up positions with the turret in the dump position, the rake cam 3702 continues to engage the actuate surface 3812 of the waste bin lid 104 and the waste bin lid 104 remains open.

Visible in FIG. 38 is the lid return spring 3502. In one embodiment, the spring 3502 is a coil spring with one end formed to engage the base 102 and the other end formed to engage the waste bin lid 104.

Figure 39:
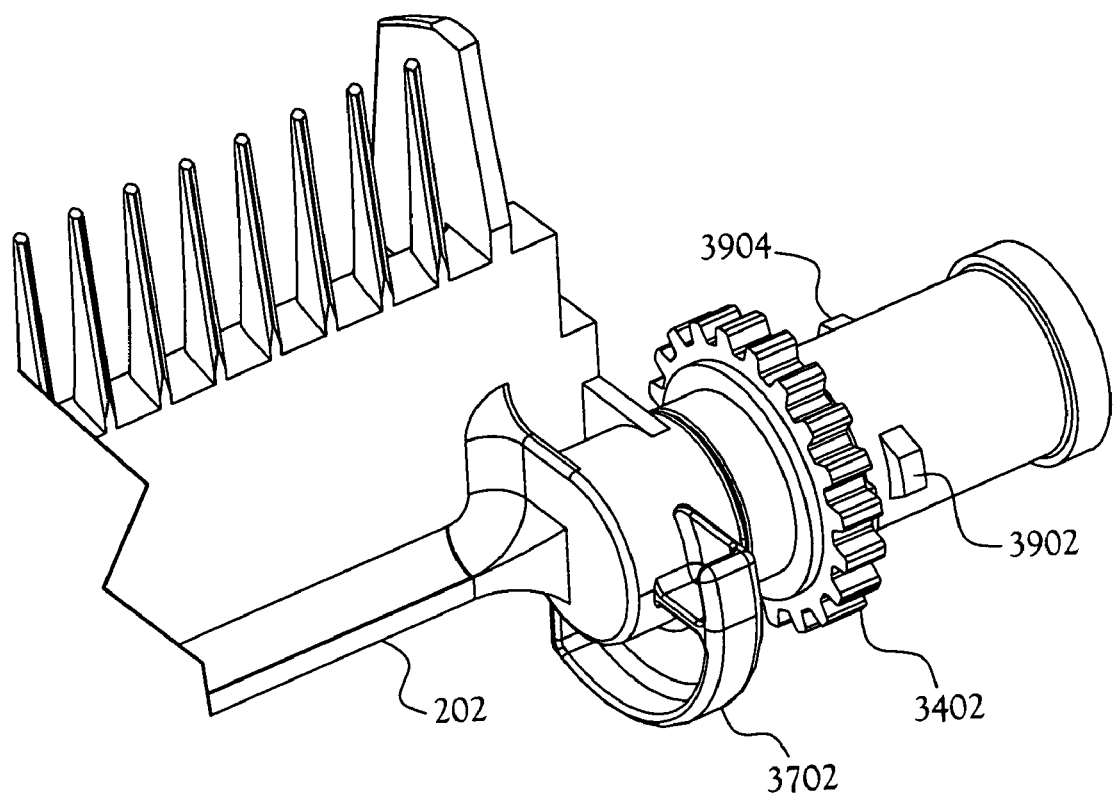
FIG. 39 is a partial perspective view of the drive end of the rake.

FIG. 39 illustrates a partial perspective view of the drive end of the rake 202. The rake 202 is rotated to the up position, thereby illustrating the rake cam 3702. Visible on the inboard shaft of the rake 202 are two of the three protrusions 3902, 3904 that engage the lever operators of the rake limit switches 412A. One protrusion 3904 is positioned to actuate the up position rake limit switch 3302 and the other protrusion 3902 is positioned to actuate the down position rake limit switch 3304. The third protrusion, that operates the mid position rake limit switch 3306, is not visible in FIG. 39.

Figure 40:
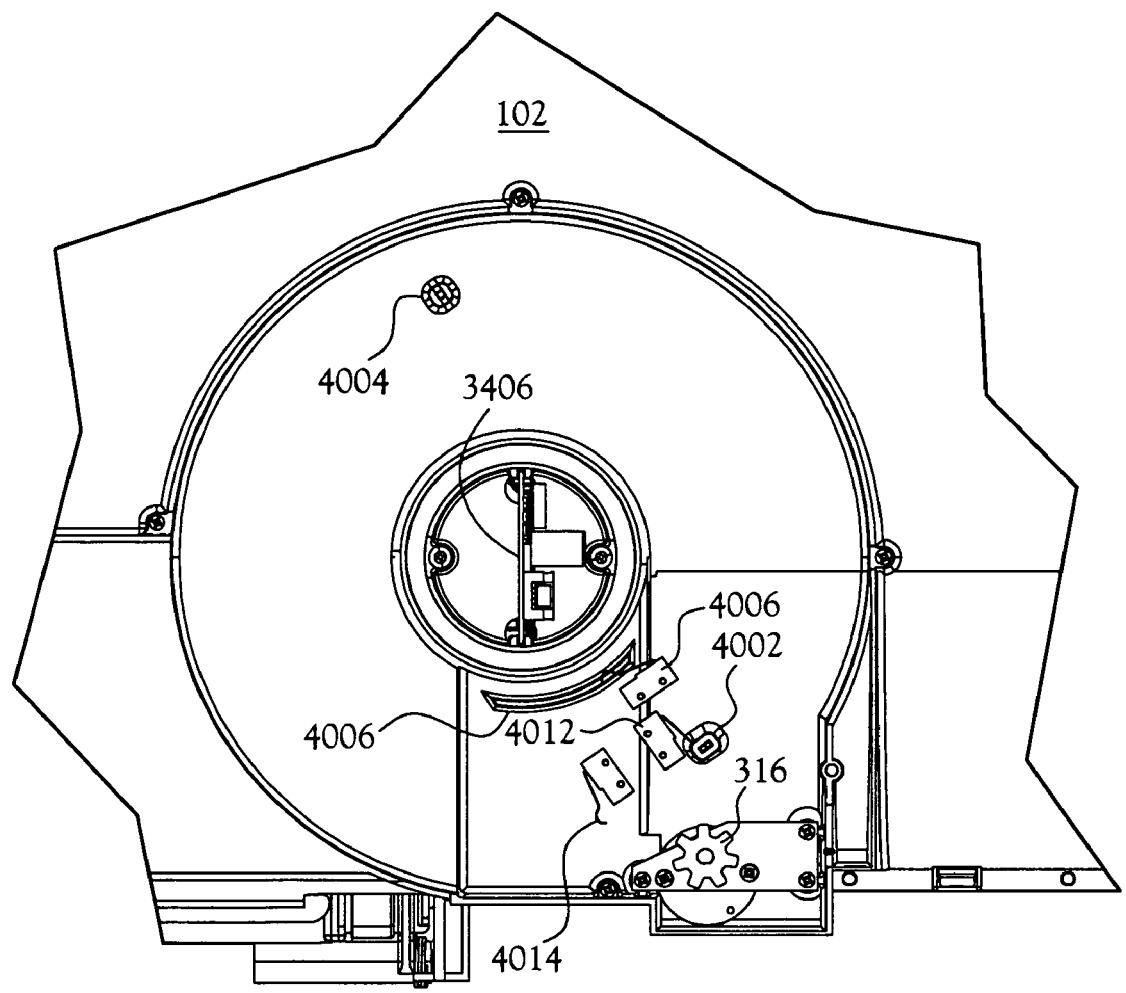
FIG. 40 is a partial bottom view of the litter box with the bottom cover and turret gear not shown.

FIG. 40 illustrates a partial bottom view of the litter box 10 with a bottom cover and the turret gear 314 not shown. The turret limit switches 4012, 4014, 4016 (collectively 412B) are mounted to the turret gear 314, which is not shown in FIG. 40 for clarity. The turret limit switches 4012, 4014, 4016 move with the turret gear 314 as it rotates between the rest, or dump, position and the scoop position.

Protruding from the base 102 are two protrusions 4002, 4004 that engage the turret limit switches 4012, 4014. The protrusion 4002 is positioned so as to engage the turret limit switch 4012 when the turret 212 is in the rest, or dump, position. The opposite protrusion 4004 is positioned so as to engage the turret limit switch 4014 when the turret 212 is in the scoop position. Protruding from the base 102 is a curved member, or wall, 4006 that engages the turret limit switch 4016 when the turret 212 is between the mid position and the scoop position.

In the embodiment illustrated in FIG. 40, the limit switches 4012, 4014, 4016 (collectively 412B) are not connected to the controller 402' through a connector 314 as illustrated in the embodiment shown in FIG. 31. In another embodiment, the limit switches 412B are secured to the base 102 and are actuated by tabs protruding from the turret gear 314 or other member of the turret 212.

The litter box 10 includes various functions. The function of rotating a rake 202 about a transverse axis, in one embodiment, is implemented by the turret 212, which carries the rake 202, rotating about an axis transverse to the rake's longitudinal axis 3704.

The function of rotating the rake 202 about a longitudinal axis 3704, in one embodiment, is implemented by the rake motor 204, including any associated drive mechanisms and gears 3402, 3404.

The function of sensing a rake position, in one embodiment, is implemented by the limit switches 412A. In one embodiment, three limit switches 412A are associated with the rake position about the rake's longitudinal axis. The limit switches 412A detect the full up position, the full down position, and the mid position. In one embodiment, three limit switches 412B are associated with the rake position about the rake's transverse axis, or, in other words, the limit switches 412B are associated with the turret position and detect the turret 212 at the rest, or dump, position, the mid position, and the scoop position.

The function of detecting an animal leaving the litter box 10, in one embodiment, is implemented by the IR sensor 416 and the software keeping track of whether an animal has just left the box 10.

The function of controlling a position of the rake 202 to sweep the litter box 10 a specified time after the animal is detected to have left the litter box 10, in one embodiment, is implemented by the software executed by the processor 404 as described in FIG. 5. In particular, the software routine determining that it is time to scoop 1904 initiates the sweeping of the litter box 10.

The function of sensing an overload condition in a rake motor 204, in one embodiment, is implemented by the processor 404 monitoring the voltage drop across a resistor in the power supply to the rake motor 204. The function of sensing an overload condition in a turret motor 206, in one embodiment, is implemented by the processor 404 monitoring the voltage drop across a resistor in the power supply to the turret motor 206. In another embodiment, the function of sensing a motor overload condition is performed by a circuit 414 connected to both the rake motor drive circuit 3114 and the turret motor drive circuit 3116.

The function of initiating a scoop sequence a specified time after the animal is detected to have left the litter box is implemented by the software executed by the processor 404 as described in FIG. 5. In particular, the software routine determining that it is time to scoop 1904 initiates the sweeping of the litter box 10.

The function of containing at least one clump of waste, in one embodiment, is implemented by the waste bin 214. The function of controlling a position of the rake 202 to deposit the clumps of waste in the waste bin 214, in one embodiment, is implemented by the software executed by the processor 404.

From the foregoing description, it will be recognized by those skilled in the art that a control system for a litter box 10 has been provided. The litter box 10 has a turret 212 carrying a rake 202, a waste bin 214, and a controller 402. Multiple limit switches 412A indicate the position of the rake 202 as it rotates about its longitudinal axis 3704. Multiple limit switches 412B indicate the position of the turret 212 as it rotates about the center point of the base 102. The waste bin 214 has an automatically opening lid 104. The lid 104 opens when a cam 3702 on the rake 202 engages a waste bin lever 3504, which pivots and forces the lid 104 to open.

The controller has a processor 404, memory 406, and an input/output unit 408. The processor 404 executes a software program for operating the litter box 10. The software, after initializing, executes a loop that continuously performs operations for monitoring and controlling the hardware associated with the litter box.

The software, in one embodiment, includes a routine for initializing the system 504 and a loop for monitoring the system 506, 508, 510, 512, 516 and servicing the motors 514. In one embodiment, the software initializes the controller, monitors the instruments, including the limit switches 412, the overload sensors 414, and the IR sensor 416, detects the animal leaving the litter box 718, and controls the motors 508, 510, 514. The software controls the motors to sweep the litter in the litter box 10, thereby collecting the waste in a waste bin 214.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for a self-cleaning litter box, said apparatus comprising:
    a base adapted to receive a quantity of litter, said base having an inside area defining a partial cylinder;
    a rake having a plurality of tines and a waste support member;
    a rake motor operatively connected to said rake, said rake motor rotating said rake about a longitudinal axis of said rake, said rake motor rotating said rake in an up direction and in a down direction;
    a plurality of rake limit switches each set to actuate upon said rake reaching a selected position;
    a turret located on a center line of said partial cylinder, said turret sweeping said rake through a selected area of said base;
    a turret motor operatively connected to said turret, said turret motor rotating said turret in a forward direction and a reverse direction;
    a plurality of turret limit switches each set to actuate upon said turret reaching a selected position;
    a motor overload sensor sensing overload conditions in said rake motor and said turret motor;
    an animal sensor adapted to sense a presence of an animal in said base; and
    a controller programmed to execute a process for controlling said rake motor and said turret motor.

2. The apparatus of claim 1 wherein said rake further includes an inboard guide member and an outboard guide member whereby said inboard guide member and said outboard guide member form a chute with said waste support member.

3. The apparatus of claim 1 further including a waste bin and a waste bin lid.

4. The apparatus of claim 1 further including a waste bin, a waste bin lid, and a waste bin lever, said waste bin lever actuated by said rake when said turret moves to a dump position.

5. The apparatus of claim 1 further including a waste bin and a waste bin lid, said rake further including a cam that operatively opens said waste bin lid when said rake is in a mid position and said turret is moving toward a dump position.

6. The apparatus of claim 1 wherein said animal sensor includes a light emitting diode and a light sensor, said light emitting diode directing a beam toward a reflector, said light sensor sensitive to said beam reflected from said reflector.

7. The apparatus of claim 1 wherein one of said plurality of rake limit switches is set to actuate upon said rake being in a mid position wherein said plurality of tines and said waste support member are substantially horizontal.

8. The apparatus of claim 1 wherein one of said plurality of turret limit switches is set to actuate upon said turret being in a mid position between a rest position and a scoop position.

9. The apparatus of claim 1 wherein said base has a scooping region adapted to enable said rake to pick up at least one animal waste product when said rake moves from a down position to a mid position, said scooping region defined by a curved surface between a bottom surface and a back wall of said base.

10. An apparatus for a self-cleaning litter box, said apparatus comprising:
    a pan having an arcuate side wall, a linear side wall, a bottom surface, and a focus point, said arcuate side wall having a first end and a second end, said linear side wall joining each of said arcuate side wall first end and said arcuate side wall second end, said focus point being substantially equidistant from a locus of points defined by said arcuate side wall, said pan being adapted to receive a quantity of litter;
    a rake having a plurality of tines adapted for raking said quantity of litter, said rake adapted to rotate about a longitudinal axis between an up position and a down position; and
    a turret extending from said pan proximate said focus point, said rake attached to said turret, said turret operatively moving said rake from a rest position to a scoop position.

11. The apparatus of claim 10 further including a controller programmed to execute a process for controlling said rake and said turret.

12. The apparatus of claim 10 further including a rake drive circuit for driving a rake motor operatively connected to said rake and a turret drive circuit for driving a turret motor operatively connected to said turret.

13. The apparatus of claim 10 further including a controller for controlling said rake and said turret, a rake drive circuit for driving a rake motor operatively connected to said rake, a turret drive circuit for driving a turret motor operatively connected to said turret, and a motor overload sensor circuit.

14. The apparatus of claim 10 further including a motor overload sensor detecting overload conditions in at least one of a rake motor and a turret motor.

15. The apparatus of claim 10 wherein said rake further includes an inboard guide member, an outboard guide member, and a waste support member; said inboard guide member, said outboard guide member, and said waste support member form a chute for channeling at least one animal waste product off of said rake with said rake in said up position.

16. The apparatus of claim 10 further including a waste bin and a waste bin lid.

17. The apparatus of claim 10 further including a waste bin, a waste bin lid, and a waste bin lever, said waste bin lever actuated by said rake when said turret moves to a dump position.

18. The apparatus of claim 10 further including a waste bin and a waste bin lid, said rake further including a cam that operatively opens said waste bin lid when said rake is in a mid position and said turret is moving toward a dump position.

19. The apparatus of claim 10 further including an animal sensor for sensing the presence of an animal in said pan.

20. The apparatus of claim 10 further including an animal sensor for sensing the presence of an animal in said pan, said animal sensor includes a light emitting diode and a light sensor, said light emitting diode directing a beam toward a reflector, said light sensor sensitive to said beam reflected from said reflector.

21. The apparatus of claim 10 further including a rake limit switch set to actuate when said rake is in a mid position wherein said plurality of tines are substantially horizontal.

22. The apparatus of claim 10 further including a turret limit switch set to actuate when said turret is in a mid position between said rest position and said scoop position.

23. The apparatus of claim 10 further including a scooping region in said pan, said scooping region defined by a curved surface between said bottom surface and said linear side wall of said base, said scooping region enabling said rake to pick up at least one animal waste product when said rake moves from said down position to a mid position.

24. An apparatus for a self-cleaning litter box, said apparatus comprising:
a base adapted to receive a quantity of litter;
a rake adapted to rotate about a longitudinal axis;
a rake motor operatively connected to said rake, said rake motor rotating said rake about the longitudinal axis of said rake, said rake motor rotating said rake in an up direction and in a down direction;
a plurality of rake limit switches associated with a plurality of specific positions of said rake;
a turret adapted to sweep said rake within said base;
a turret motor operatively connected to said turret, said turret motor rotating said turret in a forward direction and a reverse direction; and
a plurality of turret limit switches associated with a plurality of specific positions of said turret.

25. The apparatus of claim 24 further including a controller having a processor programmed to execute a process for controlling said rake and said turret.

26. The apparatus of claim 24 further including a controller for controlling said rake and said turret, a rake drive circuit for driving said rake motor operatively connected to said rake, a turret drive circuit for driving said turret motor operatively connected to said turret, and a motor overload sensor circuit.

27. The apparatus of claim 24 further including a motor overload sensor detecting overload conditions in at least one of said rake motor and said turret motor.

28. The apparatus of claim 24 wherein said rake includes an inboard guide member, an outboard guide member, and a waste support member; said inboard guide member, said outboard guide member, and said waste support member form a chute for channeling at least one animal waste product off of said rake with said rake in an up position.

29. The apparatus of claim 24 further including a waste bin and a waste bin lid.

30. The apparatus of claim 24 further including a waste bin, a waste bin lid, and a waste bin lever, said waste bin lever actuated by said rake when said turret moves to a dump position.

31. The apparatus of claim 24 further including a waste bin and a waste bin lid, said rake further including a cam that operatively opens said waste bin lid when said rake is in a mid position and said turret is moving toward a dump position.

32. The apparatus of claim 24 further including an animal sensor for sensing the presence of an animal in said base.

33. The apparatus of claim 24 further including an animal sensor for sensing the presence of an animal in said base, said animal sensor including a light emitting diode and a light sensor, said light emitting diode directing a beam toward a reflector, said light sensor sensitive to said beam reflected from said reflector.

34. The apparatus of claim 24 wherein said plurality of specific positions of said plurality of rake limit switches includes an up position and a down position.

35. The apparatus of claim 24 wherein said plurality of specific positions of said plurality of rake limit switches includes a mid position wherein a plurality of tines of said rake are substantially horizontal.

36. The apparatus of claim 24 wherein said plurality of specific positions of said plurality of turret limit switches includes a rest position and a scoop position.

37. The apparatus of claim 24 wherein said plurality of specific positions of said plurality of turret limit switches includes a mid position.

38. The apparatus of claim 24 further including a scooping region in said base, said scooping region defined by a curved surface between a bottom and a back wall of said base, said scooping region enabling said rake to pick up at least one animal waste product when said rake moves from a down position to a mid position.

39. An apparatus for a self-cleaning litter box, said apparatus comprising:
a base adapted to receive a quantity of litter;
a rake having a plurality of tines adapted for raking said quantity of litter, said rake adapted to rotate about a longitudinal axis between an up position and a down position;
a turret located at a center point of said base, said rake attached to said turret, said turret operatively moving said rake from a rest position to a scoop position;
a rake drive circuit for driving a rake motor operatively connected to said rake; and
a turret drive circuit for driving a turret motor operatively connected to said turret.

40. An apparatus for a self-cleaning litter box, said apparatus comprising:
a base adapted to receive a quantity of litter;
a rake having a plurality of tines adapted for raking said quantity of litter, said rake adapted to rotate about a longitudinal axis between an up position and a down position;
a turret located at a center point of said base, said rake attached to said turret, said turret operatively moving said rake from a rest position to a scoop position;
a controller for controlling said rake and said turret;
a rake drive circuit for driving a rake motor operatively connected to said rake;
a turret drive circuit for driving a turret motor operatively connected to said turret; and
a motor overload sensor circuit.

41. An apparatus for a self-cleaning litter box, said apparatus comprising:
a base adapted to receive a quantity of litter;
a rake having a plurality of tines adapted for raking said quantity of litter, said rake adapted to rotate about a longitudinal axis between an up position and a down position;
a turret located at a center point of said base said turret having a vertical longitudinal rotational axis, said rake attached to said turret, said turret operatively moving said rake from a rest position to a scoop position;
a waste bin;
a waste bin lid; and
a waste bin lever, said waste bin lever actuated by said rake when said turret moves to a dump position.

42. An apparatus for a self-cleaning litter box, said apparatus comprising:
a base adapted to receive a quantity of litter;
a rake having a plurality of tines adapted for raking said quantity of litter, said rake adapted to rotate about a longitudinal axis between an up position and a down position;
a turret located at a center point of said base said turret having a vertical longitudinal rotational axis, said rake attached to said turret, said turret operatively moving said rake from a rest position to a scoop position;
a waste bin; and
a waste bin lid;

wherein said rake further includes a cam that operatively opens said waste bin lid when said rake is in a mid position and said turret is moving toward a dump position.

43. An apparatus for a self-cleaning litter box, said apparatus comprising:
- a pan having an arcuate side wall, a linear side wall, a bottom surface, and a focus point, said arcuate side wall having a first end and a second end, said linear side wall joining each of said arcuate side wall first end and said arcuate side wall second end, said focus point being substantially equidistant from a locus of points defined by said arcuate side wall, said pan being adapted to receive a quantity of litter;
- a rake having a plurality of tines adapted for raking said quantity of litter, said rake adapted to rotate about a longitudinal axis between an up position and a down position;
- a rake drive circuit for driving a rake motor operatively connected to said rake;
- a turret extending from said pan proximate said focus point, said rake attached to said turret, said turret operatively moving said rake from a rest position to a scoop position; and
- a turret drive circuit for driving a turret motor operatively connected to said turret.

44. An apparatus for a self-cleaning litter box, said apparatus comprising:
- a pan having an arcuate side wall, a linear side wall, a bottom surface, and a focus point, said arcuate side wall having a first end and a second end, said linear side wall joining each of said arcuate side wall first end and said arcuate side wall second end, said focus point being substantially equidistant from a locus of points defined by said arcuate side wall, said pan being adapted to receive a quantity of litter;
- a rake having a plurality of tines adapted for raking said quantity of litter, said rake adapted to rotate about a longitudinal axis between an up position and a down position;
- a rake drive circuit for driving a rake motor operatively connected to said rake;
- a turret extending from said pan proximate said focus point, said rake attached to said turret, said turret operatively moving said rake from a rest position to a scoop position;
- a turret drive circuit for driving a turret motor operatively connected to said turret;
- a controller for controlling said rake and said turret; and
- a motor overload sensor circuit.

45. An apparatus for a self-cleaning litter box, said apparatus comprising:
- a pan having an arcuate side wall, a linear side wall, a bottom surface, and a focus point, said arcuate side wall having a first end and a second end, said linear side wall joining each of said arcuate side wall first end and said arcuate side wall second end, said focus point being substantially equidistant from a locus of points defined by said arcuate side wall, said pan being adapted to receive a quantity of litter;
- a rake having a plurality of tines adapted for raking said quantity of litter, said rake adapted to rotate about a longitudinal axis between an up position and a down position;
- a turret extending from said pan proximate said focus point, said rake attached to said turret, said turret operatively moving said rake from a rest position to a scoop position; and
- a waste bin, a waste bin lid, and a waste bin lever, said waste bin lever actuated by said rake when said turret moves to a dump position.

46. An apparatus for a self-cleaning litter box, said apparatus comprising:
- a pan having an arcuate side wall, a linear side wall, a bottom surface, and a focus point, said arcuate side wall having a first end and a second end, said linear side wall joining each of said arcuate side wall first end and said arcuate side wall second end, said focus point being substantially equidistant from a locus of points defined by said arcuate side wall, said pan being adapted to receive a quantity of litter;
- a rake having a plurality of tines adapted for raking said quantity of litter, said rake adapted to rotate about a longitudinal axis between an up position and a down position;
- a turret extending from said pan proximate said focus point, said rake attached to said turret, said turret operatively moving said rake from a rest position to a scoop position; and
- a waste bin and a waste bin lid, said rake further including a cam that operatively opens said waste bin lid when said rake is in a mid position and said turret is moving toward a dump position.

* * * * *